US012644672B2

(12) United States Patent
Winslow

(10) Patent No.: US 12,644,672 B2
(45) Date of Patent: Jun. 2, 2026

(54) AUTOMATED METHODS OF COLLECTING ENVIRONMENTAL DATA ALONG A BALLISTIC TRAJECTORY

(71) Applicant: Robert T Winslow, Park City, UT (US)

(72) Inventor: Robert T Winslow, Park City, UT (US)

( * ) Notice: Subject to any disclaimer, the term of this patent is extended or adjusted under 35 U.S.C. 154(b) by 80 days.

(21) Appl. No.: 18/615,601

(22) Filed: Mar. 25, 2024

(65) Prior Publication Data

US 2025/0257981 A1 Aug. 14, 2025

Related U.S. Application Data

(63) Continuation of application No. 17/306,917, filed on May 3, 2021, now Pat. No. 11,940,247.

(60) Provisional application No. 63/018,517, filed on May 1, 2020.

(51) Int. Cl.
| *F41G 3/06* | (2006.01) |
| *F41G 3/08* | (2006.01) |
| *G05D 1/00* | (2006.01) |
| *G05D 1/46* | (2024.01) |
| *G01P 5/24* | (2006.01) |

(52) U.S. Cl.
CPC .............. *F41G 3/08* (2013.01); *G05D 1/101* (2013.01); *G05D 1/46* (2024.01); *G01P 5/24* (2013.01)

(58) Field of Classification Search
CPC ................ F41G 3/08; G05D 1/46; G01P 5/24
See application file for complete search history.

(56) References Cited

U.S. PATENT DOCUMENTS

| 9,677,864 B1 | 6/2017 | Jankowski et al. |
| 9,886,040 B1 | 2/2018 | Kelly |
| 10,466,069 B1 | 11/2019 | Kirksey et al. |
| 10,866,065 B2 | 12/2020 | Baumgartner |
| 2011/0261193 A1* | 10/2011 | Agurok .................... G06T 7/20 |
| | | 348/E5.09 |
| 2016/0252325 A1 | 9/2016 | Sammut et al. |
| 2018/0101169 A1 | 4/2018 | Applewhite |
| 2019/0077503 A1 | 3/2019 | Reddy et al. |
| 2020/0300579 A1 | 9/2020 | Baumgartner |

* cited by examiner

*Primary Examiner* — Jamara A Franklin
(74) *Attorney, Agent, or Firm* — Total Awareness Consulting Services; Robert Winslow

(57) ABSTRACT

Automated methods may comprise automatically converting a ballistic trajectory of a projectile into a ballistic flight path. The ballistic flight path may comprise one or more segments. Each of the segments may comprise a plurality of coordinates. The coordinates may be located along the ballistic trajectory. The automated method may comprise automatically navigating an Unmanned Aerial Vehicle (UAV) along the ballistic flight path. The automated method may comprise automatically collecting environmental data along the ballistic flight path through employment of the UAV.

20 Claims, 32 Drawing Sheets

Receive Ballistic Trajectory of Projectile
1110

Convert Ballistic Trajectory into Ballistic Flight Path
1120

Navigate UAV Along Ballistic Flight Path
1130

Collect Environmental Data Along Ballistic Flight Path
1140

Communicate Environmental Data to User
1160

Estimate Ballistic Trajectory of Projectile
1710

Convert Ballistic Trajectory into Ballistic Flight Path
1720

Divide Ballistic Flight Path into Path Segments
1725

Communicate Path Segments to UAVs
1730

Collect Environmental Data Along Each Path Segment
1740

Communicate Environmental Data to User
1760

Estimate Ballistic Trajectory of Projectile
1810

Convert Ballistic Trajectory into Ballistic Flight Path
1820

Divide Ballistic Flight Path into Path Segments
1825

Communicate Path Segments to UAVs
1830

Collect Environmental Data Along Each Path Segment
1840

Assess Environmental Condition
1850

Communicate Environmental Condition to User
1860

Estimate Ballistic Trajectory of Projectile
1910

Convert Ballistic Trajectory into Ballistic Flight Path
1920

Divide Ballistic Flight Path into Path Segments
1925

Communicate Path Segments to UAVs
1930

Collect Environmental Data Along Each Path Segment
1940

Calculate Wind Hold Value
1950

Communicate Wind Hold Value to User
1960

2600

| Wind Speed at FFP 1 2610 | Wind Direction at FFP 1 2620 | Composite Wind Reading for Ballistic Trajectory 1 2630 |
|---|---|---|
| 3 mph | 3:00 | 7 mph, 3:00 |
| 3 mph | 4:00 | 8 mph, 4:00 |
| 4 mph | 3:00 | 8 mph, 3:00 |
| 5 mph | 3:00 | 10 mph, 3:00 |
| 6 mph | 3:00 | 12 mph, 3:00 |
| 7 mph | 3:00 | 13 mph, 3:00 |
| 8 mph | 3:00 | 15 mph, 3:00 |
| 10 mph | 3:00 | 18 mph, 3:00 |

2700

| Wind Speed at FFP 1 2710 | Wind Direction at FFP 1 2720 | Wind Holds for Ballistic Trajectory 1 2730 |
|---|---|---|
| 3 mph | 3:00 | 0.7 Mils |
| 3 mph | 4:00 | 0.6 Mils |
| 4 mph | 3:00 | 0.8 Mils |
| 5 mph | 3:00 | 0.9 Mils |
| 6 mph | 3:00 | 1.1 Mils |
| 7 mph | 3:00 | 1.2 Mils |
| 8 mph | 3:00 | 1.4 Mils |
| 10 mph | 3:00 | 1.7 Mils |

AUTOMATED METHODS OF COLLECTING ENVIRONMENTAL DATA ALONG A BALLISTIC TRAJECTORY

CROSS-REFERENCE TO RELATED APPLICATIONS

This application is a Continuation of U.S. patent application Ser. No. 17/306,917, filed May 3, 2021, which claims the benefit of U.S. Provisional Application No. 63/018,517, filed May 1, 2020, which are all hereby incorporated by reference in their entirety.

BACKGROUND

Many conventional approaches have been employed to assess environmental conditions prior to launching projectiles, such as, for example, bullets, balls, arrows, bolts, rocket assisted, and gun-launched rockets. Environmental conditions often impact an expected ballistic trajectory of a projectile. Longer flight times of many projectiles may experience greater impacts from wind and other environmental conditions. In many circumstances that include controlled environments, such as, for example a firing range or a testing range, conventional approaches may rely on wind flags placed at a target and/or in line with the target. In such circumstances, shooters may employ these wind flags to make subjective observations on wind conditions. Other conventional approaches may rely on wind sensors placed in static positions between a launching device and a target.

In many circumstances, such as, for example, target practice shooting and competitive shooting, conventional approaches may include practice shots to understand how current environmental conditions are impacting projectiles. In these circumstances, some environmental conditions may remain unknown as adjustments to firing solutions are made based on the observed overall impact to the projectiles on the target.

Other circumstances may require an effective impact from a first shot. Such circumstances may include, for example, military operations, law enforcement activities, and hunting activities. In such circumstances, conventional approaches may use measurements of environmental conditions at the Final Firing Position (FFP). However, many environments may have environmental conditions at a target, and between the FFP and the target, that differ from the environmental conditions at the FFP. In such environments, shooters may rely on natural indicators, such as, for example, mirage and vegetation between the FFP and the target, to make subjective observations on wind conditions. To practice making such subjective observations, many shooters and/or spotters may use partners for assistance in verifying wind conditions to improve subjective observation capability. A partner may be equipped with weather meter at an observation point. After a subjective observation is made of the observation point by a shooter and/or spotter, the partner may report the measured wind conditions for comparison to the subjective observation.

Problems may arise in conventional approaches when subjective observations are inaccurate or difficult to assess due to, for example, barren environments, clear skies, and/or when mirage is difficult to see. In addition, learning how to make subjective observations reliably may take shooters a considerable amount of time and practice.

Accordingly, given the shortcomings of conventional approaches, a need exists for unconventional approaches and devices that efficiently and more effectively enable users to assess environmental conditions.

This Background is provided to introduce a brief context for the Detailed Description that follows. This Background is not intended to be an aid in determining the scope of the claimed subject matter nor be viewed as limiting the claimed subject matter to implementations that solve any or all of the shortcomings or problems presented above.

BRIEF DESCRIPTION OF THE SEVERAL VIEWS OF THE DRAWINGS

The accompanying drawings, which are incorporated in and constitute a part of this specification, illustrate several embodiments and, together with the description, serve to explain the disclosed principles. In the drawings.

DETAILED DESCRIPTION OF EMBODIMENTS

Disclosed embodiments provide unconventional systems and methods for collecting environmental data along a ballistic trajectory. Disclosed embodiments provide unconventional systems and methods for collecting environmental data along a ballistic flight path that approximates the ballistic trajectory. Embodiments consistent with the present disclosure are rooted in computer, aeronautical, and data collecting technologies and may include collecting and processing various types of data including environmental data. Collecting and processing environmental data along a ballistic flight path may improve effectiveness over conventional devices and technological processes since environmental conditions along a ballistic trajectory are often different than the environmental conditions measured at a FFP, a target, along the ground between the FFP and the target, and/or at locations other than the actual ballistic trajectory. In addition, the unconventional systems and methods in the disclosed embodiments may lead to improved efficiency in assessing environmental conditions over conventional devices and technological processes since the unconventional systems and methods in the disclosed embodiments may be automated employing mobile airborne data collection along a ballistic trajectory. Collecting data along a ballistic trajectory may increase the accuracy of the data. Furthermore, the unconventional systems and methods in the disclosed embodiments may enable more efficient and/or more effective training for shooters and/or spotters. For example, partners of the shooters and/or spotters may not be able to measure environmental conditions at or near the maximum ordinate. In another example, partners may be unavailable or limited in number. In yet another example, partners may not be able to reach a target location or observation point. In a final example, partners may not be able to reach a target location or observation point in a timely manner. In addition, the unconventional systems and methods in the disclosed embodiments may demonstrate more effectively and/or more accurately the ballistic trajectory of a projectile to shooters and/or spotters when a UAV navigates along a ballistic flight path. The demonstration may be especially effective when done in an area of operations, especially when the area of operations includes varied terrain, vegetation, buildings, and/or other structures.

Figure 1:
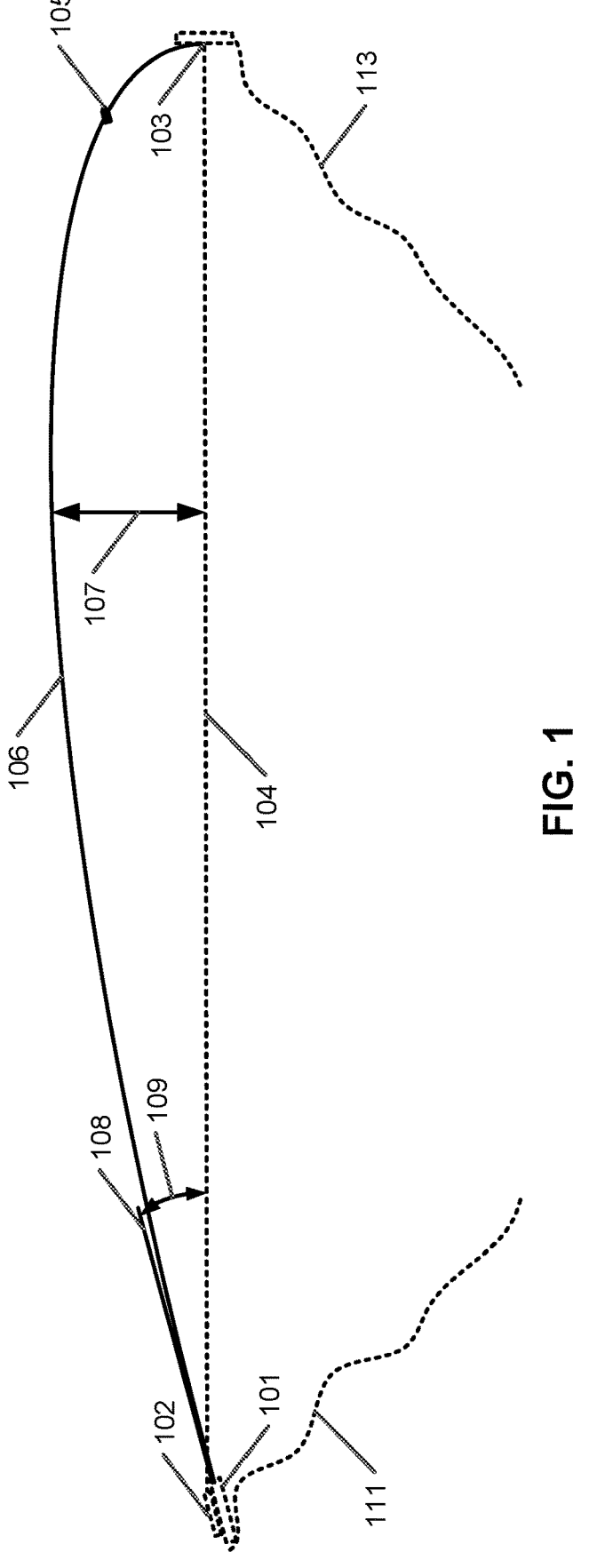
FIG. 1 illustrates an elevation view of an example ballistic trajectory of an example projectile, consistent with disclosed embodiments.
Figure 2:
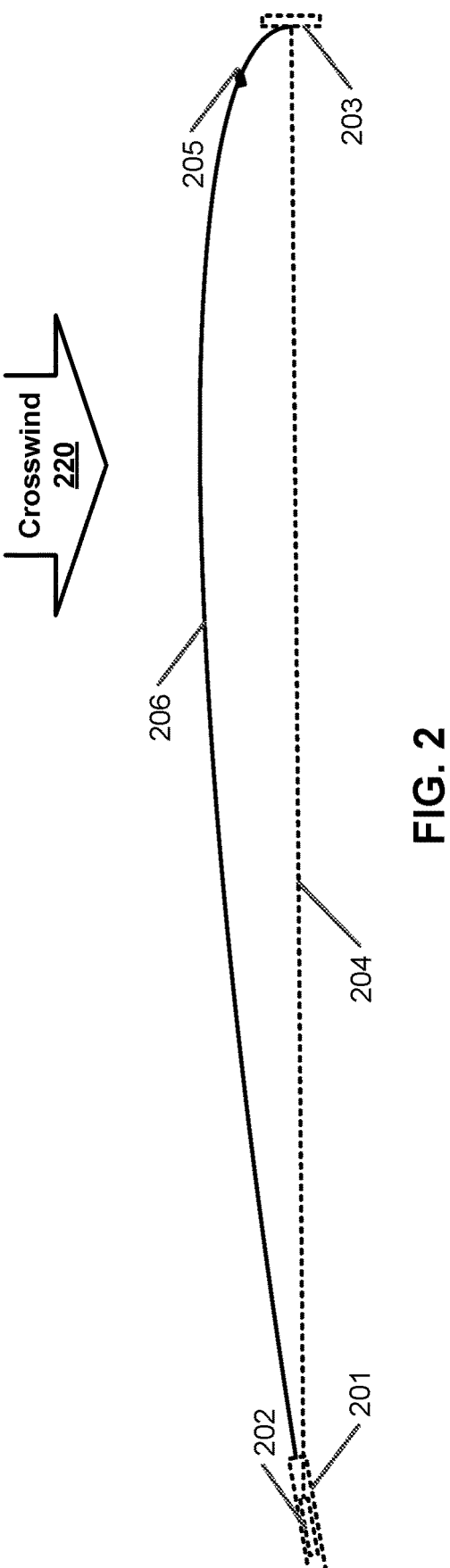
FIG. 2 illustrates an aerial view of an example ballistic trajectory of an example projectile fired into an example crosswind, consistent with disclosed embodiments.

Some conventional devices and technological processes for collecting environmental data for shooting applications may include employing one or more UAVs along a set heading and/or along a set elevation between a FFP and a target. Other conventional devices and technological processes may include employing one or more UAVs above an expected ballistic trajectory of a projectile. Some conventional devices and technological processes for collecting environmental data for shooting applications may include ground based measurement systems configured for collecting environmental data along the ground during one or more flights of one or more distinct projectiles. However, the environmental data collected through employment of the aforementioned conventional devices and technological processes may only be an approximation of the environmental conditions along a ballistic trajectory. As shown in FIGS. 1 and 2 (described below), ballistic trajectories will not comprise a constant heading or elevation, especially in longer range shooting applications and/or in windy conditions. In addition, ballistic trajectories will not remain close to the ground, especially in longer range shooting applications and/or in shooting applications over varied terrain.

Disclosed embodiments provide unconventional systems and methods for converting a ballistic trajectory of a projectile into a ballistic flight path for one or more UAVs. Embodiments consistent with the present disclosure are rooted in computer technology and may include converting a ballistic trajectory into a plurality of coordinates. The coordinates may be employed by various embodiments to automatically navigate one or more UAVs along the ballistic flight path.

Some disclosed embodiments provide unconventional systems and methods for automatically assessing an environmental condition along a ballistic flight path. The environmental condition may be based on environmental data collected at one or more points along the ballistic flight path.

Automatically assessing an environmental condition along a ballistic flight path may lead to improved efficiency over conventional devices and technological processes employed to calculate ballistic trajectories in changing environmental conditions.

Some disclosed embodiments provide unconventional systems and methods for automatically calculating a wind hold value based on environmental data collected at one or more points along a ballistic flight path. Automatically calculating a wind hold value based on environmental data collected along a ballistic flight path may lead to improved accuracy over conventional devices and technological processes employed to calculate windage adjustments in changing wind conditions.

Some disclosed embodiments provide unconventional systems and methods for automatically calculating a firing solution based on environmental data collected at one or more points along a ballistic flight path. Automatically calculating a firing solution based on environmental data collected along a ballistic flight path may lead to improved accuracy over conventional devices and technological processes employed to calculate firing solutions in changing environmental conditions, especially when wind conditions and/or surrounding terrain impact horizontal and/or vertical forces acting on a projectile during flight. Additional accuracy may be obtained when the following may be added to some of the disclosed embodiments: automatically estimating a second ballistic trajectory of a projectile based on the environmental data collected along the ballistic flight path, converting the second ballistic trajectory into a second ballistic flight path for one or more UAVs, and automatically collecting second environmental data along the second ballistic flight path.

Some disclosed embodiments provide unconventional systems and methods for automatically comparing environmental data collected along a ballistic flight path to one or more additional sets of environmental data collected along one or more additional ballistic flight paths. These automatic comparisons may lead to improved accuracy and/or efficiency over conventional devices and technological processes employed to determine distinctions between projectiles in flight. For example, comparisons between a plurality of projectiles may be more effective when environmental conditions along the ballistic flight path for each of the plurality of projectiles are known. Furthermore, the results used in the comparisons may be more consistent when subsequent projectiles are only launched during similar environmental conditions to previous flights. The similar environmental conditions may be confirmed through employment of disclosed embodiments.

In many conventional shooting scenarios, environmental conditions (e.g., wind speed and/or wind direction) along a ballistic trajectory are unknown. Some disclosed embodiments provide unconventional systems and methods for automatically constructing a reference table of environmental conditions. The reference table may, for example, comprise wind data for a plurality of ballistic flight paths, which may be based on any combination of: a single projectile, a single FFP, a single target location, and/or a single ballistic trajectory. The reference table may, for example, be employed by shooters to more efficiently estimate wind for a single ballistic trajectory given wind measurements at a single FFP. Furthermore, the reference table may lead to more accurate wind calls for the single ballistic trajectory given wind measurements at the single FFP.

As used herein, projectiles are configured to be unguided, and may be considered kinetic projectiles and/or delivery projectiles. Projectiles may be launched from projectile launching devices such as, for example, firearms, pneumatic rifles, railguns, coilguns, cannons, bows, crossbows, harpoon guns, catapults, grenade launchers, or rocket launchers.

As used herein, a Final Firing Position (FFP) is a position from where a projectile is launched or fired. In this disclosure, a FFP corresponds to a static location.

As used herein, a ballistic trajectory is the expected trajectory or an approximate trajectory of a projectile during flight. A ballistic trajectory may comprise a parabolic flight path or an estimated parabolic flight path of a projectile. The estimated parabolic flight path may be expressed as a curve that may be described mathematically. Ballistic trajectories include a maximum ordinate which is the highest point above the line of sight between a FFP and a target that the projectile reaches during flight or is expected to reach during flight. Generally, for a given projectile at a relatively consistent muzzle velocity, the longer the flight, the higher the maximum ordinate. Ballistic trajectories may be based on any combination of: calculations, mathematical models, field measurements, and/or Data On Previous Engagements (DOPE). Calculations may employ any combination of: environmental conditions, environmental parameters, projectile information, firing information, target information, and/or time of flight of a projectile. The time of flight may be calculated between two known or calculated: projectile velocities, distances from a FFP, projectile drops from a line of departure, elevations above a line of sight from a FFP to a target, and/or drifts left or right of a line of sight from a FFP to a target. Mathematical models may be based on any combination of: environmental conditions, environmental parameters, projectile information, firing information, target information, and/or time of flight of a projectile. Mathematical models may include, for example, drag models. Mathematical models may include, for example, trajectory engines. Field measurements may be made through employment of one or more chronographs and/or Doppler radar systems. Field measurements may be made through employment of one or more weather sensors.

As used herein, a drag model is a mathematical model of the drag on a projectile. The drag may be caused by fluid (e.g., air and humidity) in the surrounding environment. Many drag models rely on a ballistic coefficient which is a number used to describe the drag on a specific projectile compared to a standard projectile. Popular drag models for bullets include the G1 drag model, the G7 drag model, bullet specific drag models, and personalized drag models. Personalized drag models may be based on a specific projectile and/or cartridge, as well as a specific projectile launching device. Persons having ordinary skill in the art will recognize that other drag models exist including, but not limited to, G2, G5, G6, G8, and GL.

As used herein, a trajectory engine may comprise one or more mathematical models of the drag on a projectile. A trajectory engine may rely on a drag coefficient. The drag coefficient may be specific for a specific projectile. A trajectory engine may rely on a velocity of a projectile.

As used herein, environmental parameters may comprise measurements of at least one of the following: air temperature, humidity, barometric pressure, air density, wind speed, wind direction, and/or any other environmental measurement.

As used herein, projectiles may be launched with the aid of a sighting system. A sighting system may comprise a scope. A scope may comprise a reticle. The sighting system may comprise at least one adjustable component. A sighting system may comprise a sight. A sighting system may comprise a front sight and a rear sight. The front sight and/or the rear sight may comprise an adjustable component configured to adjust the sighting system vertically (i.e., elevation) or horizontally (i.e., windage).

As used herein, an Unmanned Aerial Vehicle (UAV) may comprise an unmanned helicopter with a guidance system. A UAV may comprise a multi-rotor drone with a guidance system. Each of the rotors in a multi-rotor drone may be powered by a dedicated motor. Each of the rotors in a multi-rotor drone may be governed by an electronic speed controller. The UAV may be configured for remote control. The UAV may comprise a guidance system. A guidance system may comprise a Global Positioning System (GPS) receiver. A guidance system may be configured to navigate a UAV autonomously or semi-autonomously. For example, a guidance system may be configured to navigate a UAV along a flight path. The flight path may comprise a plurality of coordinates. The coordinates may comprise a plurality of GPS coordinates or any other coordinates that represent a three-dimensional location. The coordinates may comprise any combination of: distances, bearings, and/or angles from a known three-dimensional location that may be employed to calculate a plurality of additional three-dimensional locations.

As used herein, an anemometer may be configured to measure any combination of: wind speed, wind direction, and/or wind velocity. Two or three anemometers may be employed to measure any combination of: wind speed, wind direction, and/or wind velocity in two or three dimensions. An anemometer may comprise a digital anemometer. The anemometer may comprise an ultrasonic anemometer. The ultrasonic anemometer may comprise a three-dimensional (3D) ultrasonic anemometer which may be configured to sense wind movements in three dimensions (e.g., pitch, roll, and yaw). The anemometer may comprise an acoustic resonance anemometer. The anemometer may comprise a laser Doppler anemometer. The anemometer may be coupled to at least one of the following: a humidity sensor, a barometric pressure sensor, a 3D accelerometer, a magnetic field sensor, and/or any other sensor.

As used herein, a wind direction may be expressed by employing a clock system. In the clock system, clock readings are relative to directions. In the clock system, the direction of fire is 12:00. For example, a shooter at a FFP facing a target may be expressed as facing 12:00. A wind coming from the shooter's right hand side directly perpendicular to the direction the shooter is facing may be expressed as a 3:00 wind. A wind coming from the shooter's left hand side directly perpendicular to the direction the shooter is facing may be expressed as a 9:00 wind. A wind coming from directly behind the shooter may be expressed as a 6:00 wind.

Embodiments consistent with the present disclosure may include projectile information which may comprise projectile data related to a projectile. The projectile data may comprise at least one of: mass, caliber, at least one dimension, shape, sectional density, and/or ballistic coefficient.

Embodiments consistent with the present disclosure may include firing information which may comprise firing data related to a projectile launching device. The firing data may comprise at least one of: direction of fire, angle of departure, barrel length, barrel twist rate, sight height above bore, draw length, draw weight, IBO (International Bowhunting Organization™) speed, expected muzzle velocity of a projectile, and/or expected projectile velocity at launch.

Embodiments consistent with the present disclosure may include target information which may comprise target data related to a target. The target data may comprise at least one of: a range to a target (from a FFP), a bearing to a target (from a FFP), time of flight of a projectile to reach a target, target dimensions, target elevation, and/or inclination angle to a target (from a FFP). The range to a target may comprise a line of sight distance from a FFP to the target, or a horizontal distance (i.e., effective range) from the FFP to the target.

Embodiments consistent with the present disclosure may include a FFP location. The FFP location may be expressed as a FFP coordinate. The FFP location may be a FFP point selected on a map. The FFP point selected on a map may be converted into the FFP coordinate. The FFP coordinate may comprise a GPS coordinate or any other coordinate that represents a three-dimensional location.

Embodiments consistent with the present disclosure may include a target location. The target location may be expressed as a target coordinate. The target location may be a target point selected on a map. The target point selected on a map may be converted into a target coordinate. The target coordinate may comprise a GPS coordinate or any other coordinate that represents a three-dimensional location. The target location may be derived using a bearing from a FFP and a distance from the FFP. A target may be identified by a laser.

Embodiments consistent with the present disclosure may include a maximum ordinate location. The maximum ordinate location may be expressed as a maximum ordinate coordinate. The maximum ordinate coordinate may comprise a GPS coordinate or any other coordinate that represents a three-dimensional location. The maximum ordinate location may be calculated based on a ballistic trajectory. The maximum ordinate location may be calculated based on a FFP location and a target location. The maximum ordinate location may be calculated based on any combination of: a FFP location, a direction of fire, an angle of departure of a projectile launching device, a range to a target, an inclination angle, and/or a time of flight.

Embodiments consistent with the present disclosure may include converting a ballistic trajectory into a ballistic flight path. The ballistic trajectory may be determined to comprise an elevation at each of a plurality of distances from a FFP. The plurality of distances may correspond to a distance from the FFP along a line of sight between the FFP and a target. The plurality of distances may be expressed though distance measurements such as, for example, inches, feet, yards, centimeters, or meters. Each of the plurality of distances may be equidistant from each other. For example, the plurality of distances may comprise every foot, every yard, every 10 yards, every 25 yards, or every 100 yards from the FFP. The elevation may comprise, for example, a vertical angle from the FFP. The elevation may comprise, for example, a distance, up or down, from a line of sight between the FFP and the target. The elevation at any given distance from the FFP may be determined through employment of any combination of: calculations, mathematical models, field measurements, and/or DOPE. The ballistic trajectory may be determined to comprise a windage at each of the plurality of distances from the FFP. The windage may comprise, for example, a horizontal angle from the FFP. The windage may comprise, for example, a distance, left or right, from a line of sight between the FFP and the target. The windage at any given distance from the FFP may be determined through employment of any combination of: calculations, mathematical models, field measurements, and/or DOPE. The line of sight between the FFP to the target may be determined to comprise a bearing from the FFP to the target. The bearing from the FFP to the target may be determined based on firing location information and target location information. The line of sight between the FFP to the target may be determined to comprise a vertical angle (i.e., inclination angle) or distance, up or down, between the FFP and the target. The vertical angle or distance may account for elevation changes between the FFP and target. The vertical angle or distance may be determined based on firing location information and target location information. Converting a ballistic trajectory into a ballistic flight path may comprise converting the elevation and/or windage, at each of the plurality of distances from the FFP location, into a coordinate. Calculations employed to convert a ballistic trajectory into a ballistic flight path may employ firing location information and optionally, target location information. Converting a ballistic trajectory into a ballistic flight path may comprise converting a parabolic flight path or an estimated parabolic flight path of a projectile into coordinates relative to the FFP. Calculations employed to convert a parabolic flight path or an estimated parabolic flight path into a ballistic flight path may employ firing location information and optionally, target location information.

For example, a ballistic trajectory may be determined to comprise the following:

| Distance 1: | elevation angle 1 | windage angle 1 |
|---|---|---|
| Distance 2: | elevation angle 2 | windage angle 2 |
| Distance 3: | elevation angle 3 | windage angle 3 |
| Distance 4: | elevation angle 4 | windage angle 4 |
| Distance 5: | elevation angle 5 | windage angle 5 |

In this example, distance 1-5 may each express a distance from the FFP. Elevation angle 1-5 may each be expressed as an angular measurement (e.g., Milliradians or Minutes of Angle) from the FFP in the direction of a target. Windage angle 1-5 may each be expressed as an angular measurement (e.g., Milliradians or Minutes of Angle) from the FFP in the direction of the target.

In another example, a ballistic trajectory may be determined to comprise the following:

| Distance 1: | elevation height 1 | windage distance 1 |
|---|---|---|
| Distance 2: | elevation height 2 | windage distance 2 |
| Distance 3: | elevation height 3 | windage distance 3 |
| Distance 4: | elevation height 4 | windage distance 4 |
| Distance 5: | elevation height 5 | windage distance 5 |

In this example, distance 1-5 may each express a distance from the FFP in the direction of a target. Elevation height 1-5 may each be expressed in a distance (e.g., inches or feet) above a line of sight between the FFP and the target. Windage 1-5 may be each expressed in a distance (e.g., inches or feet) right or left of the line of sight between the FFP and the target.

The ballistic trajectory from either of the examples above may be converted into a ballistic flight path according to embodiments consistent with the present disclosure. The ballistic flight path may, for example, comprise:

Firing location
Coordinate 1
Coordinate 2
Coordinate 3
Coordinate 4
Coordinate 5

In this example, coordinate 5 may comprise a target coordinate.

Embodiments consistent with the present disclosure may include a wind hold value. A wind hold value may be the windage adjustment (or hold off) needed to compensate for the impacts of the wind between a FFP and a target along a ballistic trajectory. A wind hold value may be expressed in angular measurements (e.g., Minutes of Angle, or Milliradians), and/or a distance (e.g., centimeters, meters, inches, feet, and/or yards) measured on a target or at the target distance. A wind hold value may comprise an absolute value. A wind hold value may comprise an adjustment value that may be applied to a calculated wind hold value at a FFP.

Embodiments consistent with the present disclosure may include a firing solution. A firing solution may comprise an elevation (e.g., vertical angle or distance, up or down, from a line of sight between a FFP and a target) value. An elevation value may comprise an elevation adjustment to a sighting system that is necessary for a given projectile to hit a target at a given distance. An elevation adjustment may comprise a combination of one or more adjustments needed in a sighting system to compensate for vertical forces acting on a projectile travelling along a ballistic trajectory. The vertical forces may be due to any combination of: air, gravity, Coriolis drift, Magus effect, Poisson effect, wind, aerodynamic jump, and/or any other forces with a vertical component. A firing solution may comprise a windage (e.g., horizontal angle or distance, left or right, from a line of sight between a FFP and a target) value. A windage value may comprise a windage adjustment to a sighting system that is necessary for a given projectile to hit a target at a given distance. A windage adjustment may comprise a combination of one or more adjustments needed in a sighting system to compensate for horizontal forces acting on a projectile travelling along a ballistic trajectory. The horizontal forces may be due to any combination of spin drift, Coriolis drift, Magus effect, Poisson effect, wind, and/or any other forces with a horizontal component. A firing solution may be expressed in angular measurements (e.g., Minutes of Angle, or Milliradians), or a distance (e.g., centimeters, meters, inches, feet, and/or yards) measured on a target or at the target distance. A firing solution may be expressed in absolute values. A firing solution may be expressed in adjustment values that may be applied to a calculated firing solution at a FFP.

Embodiments consistent with the present disclosure may comprise systems and/or devices configured to communicate automatically with a user device. The user device may comprise a mobile computing device. The user device may comprise a wearable computing device. The user device may comprise an electronic range finder. The user device may comprise a weather meter. A weather meter may comprise at least one weather sensor. The weather meter may be integrated into a weather station. The user device may comprise a sighting system. A sighting system may be configured for automatic reticle and/or pin adjustment for elevation and/or windage. The user device may comprise a projectile velocity measurement system. At least one user device may be configured to communicate with at least one UAV. Each of a plurality of user devices may be configured to communicate with at least one other user device.

Embodiments consistent with the present disclosure may include an automated system for collecting environmental data along a ballistic trajectory. The automated system may comprise at least one memory storing instructions, and at least one processor configured to execute the instructions to perform operations. The operations may comprise automatically estimating the ballistic trajectory of a projectile. The operations may comprise electronically retrieving a ballistic trajectory of a projectile from a database in communication with the system. The ballistic trajectory may be based on at least projectile information. The ballistic trajectory may be also based on firing information and/or target information. The operations may comprise automatically converting the ballistic trajectory into a ballistic flight path. The ballistic flight path may comprise a plurality of coordinates. The ballistic flight path may comprise an approximation of the ballistic trajectory. The ballistic flight path may be based on firing location information and optionally, target location information. The operations may comprise electronically communicating the ballistic flight path to a guidance system of a UAV. The guidance system may be configured to cause the UAV to navigate along the ballistic flight path. The operations may comprise automatically collecting environmental data along the ballistic flight path.

Embodiments consistent with the present disclosure may include a UAV. The UAV may comprise at least one memory storing instructions, and at least one processor configured to execute the instructions to perform operations. The operations may comprise electronically receiving a ballistic trajectory of a projectile. The operations may comprise electronically retrieving a ballistic trajectory of a projectile from a database in communication with the UAV. The operations may comprise automatically estimating the ballistic trajectory of a projectile. The ballistic trajectory may be based on, at least, projectile information. The ballistic trajectory may be also based on firing information and/or target information. The operations may comprise automatically converting the ballistic trajectory into a ballistic flight path. The ballistic flight path may comprise a plurality of coordinates. The ballistic flight path may comprise an approximation of the ballistic trajectory. The ballistic flight path may be based on firing location information. The ballistic flight path may be based on target location information. The operations may comprise automatically navigating the UAV along the ballistic flight path. The operations may comprise automatically collecting environmental data along the ballistic flight path.

Embodiments consistent with the present disclosure may include at least one UAV. Each of the at least one UAV may be coupled to at least one UAV sensor. The at least one UAV sensor may comprise at least one anemometer configured to transmit wind speed data and/or wind direction data. The at least one UAV sensor may comprise an air temperature sensor configured to transmit air temperature data. The at least one UAV sensor may comprise a humidity sensor configured to transmit humidity data. The at least one UAV sensor may comprise a barometric pressure sensor configured to transmit barometric pressure data. The at least one UAV sensor may comprise a 3D accelerometer configured to transmit 3D acceleration data. The at least one UAV sensor may comprise a magnetic field sensor configured to transmit magnetic field data. The at least one UAV sensor may comprise an ambient air density sensor configured to transmit air density data. The at least one UAV sensor may be configured to communicate with a UAV. The at least one UAV sensor may be configured to communicate with a user device. The at least one UAV sensor may be configured to communicate with a weather sensor.

Embodiments consistent with the present disclosure may include an automated system for collecting environmental data along a ballistic trajectory. The automated system may comprise at least one memory storing instructions, and at least one processor configured to execute the instructions to perform operations. The operations may comprise automatically estimating the ballistic trajectory of a projectile. The operations may comprise electronically retrieving a ballistic trajectory of a projectile from a database in communication with the system. The ballistic trajectory may be based on at least projectile information. The ballistic trajectory may be also based on firing information and/or target information. The operations may comprise automatically converting the ballistic trajectory into a ballistic flight path. The ballistic flight path may comprise a plurality of coordinates. The ballistic flight path may comprise an approximation of the ballistic trajectory. The ballistic flight path may be based on firing location information. The ballistic flight path may be based on target location information. The operations may comprise automatically dividing the ballistic flight path into a plurality of path segments. A path segment may comprise a starting coordinate and an ending coordinate. The starting coordinate and the ending coordinate may be located along the ballistic flight path. The operations may comprise electronically communicating the path segments to a plurality of UAVs. Each of the UAVs may be configured to navigate along a flight path that includes at least one of the path segments. Each of the UAVs may be configured to navigate from a starting position. The starting position may comprise a location near a FFP, a location on the ground under an expected ballistic trajectory and/or path segment, a location hovering above or adjacent to an expected ballistic trajectory and/or path segment, or any other starting location. The operations may comprise automatically collecting environmental data along each of the path segments.

Embodiments consistent with the present disclosure may include an automated system for collecting environmental data along a ballistic trajectory. The automated system may comprise at least one memory storing instructions, and at least one processor configured to execute the instructions to perform operations. The operations may comprise electronically receiving the ballistic trajectory of a projectile. The operations may comprise electronically retrieving a ballistic trajectory of a projectile from a database in communication with the system. The ballistic trajectory may be based on at least projectile information. The ballistic trajectory may be also based on firing information and/or target information. The operations may comprise automatically converting the ballistic trajectory into a ballistic flight path. The ballistic flight path may comprise a plurality of coordinates. The ballistic flight path may comprise an approximation of the ballistic trajectory. The ballistic flight path may be based on firing location information. The ballistic flight path may be based on target location information. The operations may comprise automatically dividing the ballistic flight path into a plurality of path segments. The operations may comprise electronically communicating the path segments to a plurality of UAVs. Each of the UAVs may be configured to navigate along a flight path that includes at least one of the path segments. Each of the UAVs may be configured to navigate from a starting position. The starting position may comprise a location near a FFP, a location on the ground under an expected ballistic trajectory and/or path segment, a location hovering above or adjacent to an expected ballistic trajectory and/or path segment, or any other starting location. The operations may comprise automatically collecting environmental data along each of the path segments.

Embodiments consistent with the present disclosure may include an automated system for collecting environmental data at a maximum ordinate of a ballistic trajectory. The automated system may comprise at least one memory storing instructions, and at least one processor configured to execute the instructions to perform operations. The operations may comprise automatically estimating the ballistic trajectory of a projectile. The operations may comprise electronically retrieving a ballistic trajectory of a projectile from a database in communication with the system. The ballistic trajectory may be based on, at least, projectile information. The ballistic trajectory may be also based on firing information and/or target information. The operations may comprise automatically deriving a maximum ordinate location from the ballistic trajectory. Automatically deriving the maximum ordinate location may employ firing location information and optionally, target location information. The operations may comprise automatically converting the ballistic trajectory into a ballistic flight path. The ballistic flight path may include the maximum ordinate location. The operations may comprise electronically communicating the ballistic flight path to a guidance system of a UAV. The guidance system may be configured to cause the UAV to navigate along the ballistic flight path. The operations may comprise automatically collecting environmental data at the maximum ordinate location.

Embodiments consistent with the present disclosure may include a UAV. The UAV may comprise at least one memory storing instructions, and at least one processor configured to execute the instructions to perform operations. The operations may comprise electronically receiving a ballistic trajectory of a projectile. The operations may comprise electronically retrieving the ballistic trajectory of the projectile from a database in communication with the UAV. The operations may comprise automatically estimating the ballistic trajectory of the projectile. The ballistic trajectory may be based on at least projectile information. The ballistic trajectory may be also based on firing information and/or target information. The operations may comprise automatically deriving a maximum ordinate location from the ballistic trajectory. Automatically deriving the maximum ordinate location may employ firing location information and optionally, target location information. The operations may comprise automatically converting the ballistic trajectory into a ballistic flight path. The ballistic flight path may include the maximum ordinate location. The operations may comprise automatically navigating the UAV along the ballistic flight path. The operations may comprise automatically collecting environmental data at the maximum ordinate location.

Embodiments consistent with the present disclosure may include automatically estimating a ballistic trajectory of a projectile. The ballistic trajectory may be based on at least one of the following: projectile information, firing information, target information, and/or any other ballistic information.

Embodiments consistent with the present disclosure may include electronically receiving a ballistic trajectory of a projectile or electronically retrieving the ballistic trajectory of the projectile from a database.

Embodiments consistent with the present disclosure may include automatically converting a ballistic trajectory into a ballistic flight path. The ballistic flight path may comprise a plurality of coordinates. The ballistic flight path may be based on at least: firing location information, and target location information.

Embodiments consistent with the present disclosure may include electronically communicating a ballistic flight path to a guidance system of a UAV. The guidance system may be configured to cause the UAV to navigate along the ballistic flight path.

Embodiments consistent with the present disclosure may include automatically navigating a UAV along a ballistic flight path.

Embodiments consistent with the present disclosure may include automatically collecting environmental data along a ballistic flight path. The environmental data may be automatically collected at each of a plurality of coordinates along the ballistic flight path. The environmental data may be automatically collected through employment of a UAV.

Embodiments consistent with the present disclosure may include automatically dividing a ballistic flight path into a plurality of path segments.

Embodiments consistent with the present disclosure may include electronically communicating path segments to a plurality of UAVs. Each of the UAVs may be configured to navigate along a flight path that includes at least one of the path segments.

Embodiments consistent with the present disclosure may include automatically collecting environmental data along each of a plurality of path segments. The environmental data may be automatically collected at one or more coordinates associated with each of the path segments.

In some embodiments, operations may comprise automatically estimating a second ballistic trajectory of a projectile. The second ballistic trajectory may be based on environmental data collected along a ballistic flight path. The second ballistic trajectory may also be based on any combination of: projectile information, firing information, and/or target information. The operations may comprise automatically comparing the second ballistic trajectory to a ballistic trajectory estimated previously. The operations may comprise automatically determining if the second ballistic trajectory should be converted into a second ballistic flight path. For example, if the second ballistic trajectory is significantly different than the ballistic trajectory estimated previously, then the second ballistic trajectory may be converted into a second ballistic flight path. The operations may comprise automatically converting the second ballistic trajectory into the second ballistic flight path. The second ballistic flight path may comprise a plurality of coordinates. The second ballistic flight path may comprise an approximation of the second ballistic trajectory. The second ballistic flight path may be based on firing location information and optionally, target location information. The operations may comprise electronically communicating the second ballistic flight path to a guidance system of a UAV. The guidance system may be configured to cause the UAV to navigate along the second ballistic flight path. The operations may comprise automatically collecting environmental data along the second ballistic flight path.

In some embodiments, operations may comprise electronically receiving at least one of the following: projectile information, firing information, target information, and/or any other ballistic information.

In some embodiments, operations may comprise automatically communicating environmental data to a user. The user may employ a UAV. The user may employ a user device which may be in communication with the UAV. The operations may comprise automatically assessing an environmental condition based on the environmental data, and automatically communicating the environmental condition to the user. The environmental condition may comprise a composite wind reading. The composite wind reading may be based on environmental data collected at more than one point along a ballistic flight path. The environmental condition may be based on environmental parameters. The environmental parameters may be based on weather sensor data received from a weather sensor. The weather sensor may be collocated with a FFP, a target, or at a location between the FFP and the target. The weather sensor data may be received before or during the flight of the UAV. The operations may comprise automatically calculating a wind hold value based on projectile information and the environmental data. The wind hold value may also be based on target information. The operations may comprise automatically communicating the wind hold value to the user. The operations may comprise automatically calculating a firing solution. The firing solution may be based on at least one of the following: projectile information, firing information, target information, environmental data, and/or any other ballistic information. The operations may comprise automatically communicating the firing solution to the user.

In some embodiments, operations may comprise automatically comparing environmental data collected along a ballistic flight path to one or more additional sets of environmental data collected along one or more additional ballistic flight paths. Each of the one or more additional ballistic flight paths may be based on a distinct projectile.

In some embodiments, operations may comprise automatically constructing a reference table of environmental conditions. The reference table may comprise wind speed and wind direction at a FFP for a plurality of ballistic flight paths. The plurality of ballistic flight paths may be based on any combination of: a single projectile, a single FFP location, a single target location, and/or a single ballistic trajectory. The reference table may comprise a composite wind reading for each of the plurality of ballistic flight paths. The reference table may comprise a wind hold value for each of the plurality of ballistic flight paths. The reference table may comprise wind speed and wind direction for a plurality of coordinates along each of the plurality of ballistic flight paths. Each of the plurality of coordinates may be expressed as a distance from the FFP. The operations may comprise automatically adding additional data to the reference table over additional times and/or dates. The operations may comprise automatically constructing additional reference tables for any combination of: addition projectiles, FFP locations, target locations, and/or ballistic trajectories.

Embodiments consistent with the present disclosure may include a ballistic flight path. The ballistic flight path may comprise a plurality of coordinates. The coordinates may comprise a starting coordinate. The starting coordinate may be at or near an FFP location. The coordinates may comprise a maximum ordinate coordinate. The maximum ordinate coordinate may correspond to a maximum ordinate location. The coordinates may comprise a target coordinate. The target coordinate may be at or near a target location.

Embodiments consistent with the present disclosure may include firing location information. The firing location information may comprise a FFP location. The FFP location may comprise a three-dimensional location. In some embodiments, the firing location information may comprise a starting position of a UAV.

Embodiments consistent with the present disclosure may include target location information. The target location information may comprise a target location. The target location may comprise a three-dimensional location. The target location may be determined through employment of firing information and/or target information.

Embodiments consistent with the present disclosure may include automatically collecting environmental data along a ballistic flight path. Collecting environmental data along the ballistic flight path may comprise data collection on a time interval, on a flight distance interval, and/or at each of a plurality of coordinates. Collecting environmental data may comprise receiving UAV sensor data from at least one UAV sensor.

Embodiments consistent with the present disclosure may include automatically communicating environmental data to a user.

Embodiments consistent with the present disclosure may include receiving at least one of the following: projectile information, firing information, target information, and/or any other ballistic information.

Embodiments consistent with the present disclosure may include automatically assessing an environmental condition based on environmental data, and automatically communicating the environmental condition to a user. The environmental condition may comprise a composite wind reading. The environmental condition may also be based on environmental parameters.

Embodiments consistent with the present disclosure may include automatically calculating a wind hold value based on projectile information and environmental data, and automatically communicating the wind hold value to a user.

Embodiments consistent with the present disclosure may include automatically calculating a firing solution, and automatically communicating the firing solution to a user. The firing solution may be based on at least one of the following: projectile information, firing information, target information, environmental data, and/or any other ballistic information.

In some embodiments, a projectile may be configured to be spin stabilized in flight.

In some embodiments, a ballistic trajectory may be based on environmental parameters. The environmental parameters may be based on weather sensor data received from a weather sensor. The weather sensor may be collocated with a FFP, a target, or at a location between the FFP and the target. The weather sensor data may be received before or during the flight of a UAV. The environmental parameters may be based on UAV sensor data received from at least one UAV sensor. UAV sensors may be integrated with the UAV or otherwise connected to the UAV. The environmental parameters may be based on UAV sensor data received from a plurality of UAVs.

In some embodiments, a ballistic trajectory may be updated during a flight of a UAV. The ballistic trajectory may be updated due to a change in environmental parameters. An updated ballistic trajectory may be converted to an updated ballistic flight path.

In some embodiments, collecting environmental data may comprise receiving data from an anemometer. The anemometer may comprise an ultrasonic anemometer. The ultrasonic anemometer may be configured to measure wind speed and wind direction. The ultrasonic anemometer may be configured to measure wind speed and wind direction in three dimensions. Wind speed and wind direction measurements may be adjusted to compensate for UAV speed and/or direction of travel. Wind speed and wind direction measurements may be adjusted to compensate for UAV pitch, roll, and yaw.

In some embodiments, environmental data may comprise wind speed data and/or wind direction data. The environmental data may comprise air temperature data. The environmental data may comprise barometric pressure data. The environmental data may comprise humidity data. The environmental data may comprise air density data.

In some embodiments, environmental data may be based on thrust information. The thrust information may comprise calculated wind speed and/or wind direction based on an amount of effective thrust needed by one or more motors of a UAV to compensate for wind while attempting to navigate along a ballistic flight path or path segment. Effective thrust may be based on rotor speed and/or rotor tilt. Effective thrust may be based on 3D accelerometer measurements of UAV pitch, roll, and yaw. Effective thrust may be based on measurements from a magnetometer integrated with or connected to the UAV. The thrust information may correspond to one or more coordinates of a ballistic flight path or path segment.

In some embodiments, operations may comprise automatically calculating a wind hold value based on projectile information and environmental data. The operations may comprise automatically communicating the wind hold value to a user.

In some embodiments, operations may comprise automatically calculating a firing solution based on projectile information, firing information, target information, and environmental data. The operations may comprise automatically communicating the firing solution to a user.

Reference will now be made in detail to example embodiments, examples of which are illustrated in the accompanying drawings and disclosed herein. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

FIG. 1 illustrates an elevation view of an example ballistic trajectory 106 of an example projectile 105, consistent with disclosed embodiments. Projectile 105 may be launched from launching device 101. Sighting system 102 may be associated with launching device 101. Launching device 101 and sighting system 102 may be located at a FFP. The FFP may be located on FFP terrain 111. Target 103 may be located on target terrain 113. Line of sight 104 may comprise a line of sight from sighting system 102 to target 103. Launching device 101 may be adjusted to a line of departure 108. Angle of departure 109 may comprise the angle between line of sight 104 and line of departure 108. Angle of departure 109 may be necessary in order for projectile 105 to hit target 103 given ballistic trajectory 106. Ballistic trajectory 106 may comprise a maximum ordinate. Maximum ordinate height 107 may comprise the height above line of sight 104 at the maximum ordinate.

FIG. 2 illustrates an aerial view of an example ballistic trajectory 206 of an example projectile 205 fired into an example crosswind 220 (as shown), consistent with disclosed embodiments. Projectile 205 may be launched from launching device 201. Sighting system 202 may be associated with launching device 201. Line of sight 204 may comprise a line of sight from sighting system 202 to target 203.

Figure 3:
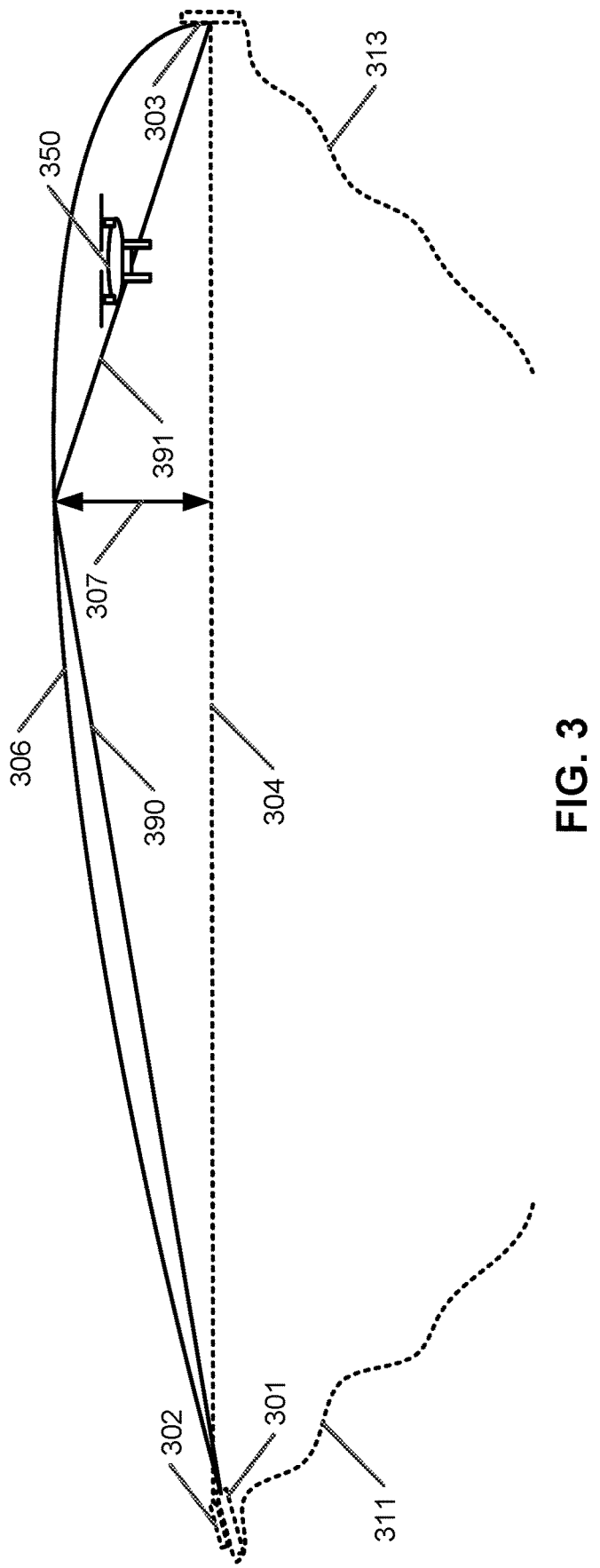
FIG. 3 illustrates an elevation view of an example Unmanned Aerial Vehicle (UAV) navigating along a first example ballistic flight path, consistent with disclosed embodiments.

FIG. 3 illustrates an elevation view of an example UAV 350 navigating along a first example ballistic flight path, consistent with disclosed embodiments. Ballistic trajectory 306 may be based on launching device 301. Sighting system 302 may be associated with launching device 301. Launching device 301 and sighting system 302 may be located at a FFP. The FFP may be located on FFP terrain 311. Target 303 may be located on target terrain 313. Line of sight 304 may comprise a line of sight from sighting system 302 to target 303. Ballistic trajectory 306 may comprise a maximum ordinate. Maximum ordinate height 307 may comprise the height above line of sight 304 at the maximum ordinate. Ballistic trajectory 306 may be converted into a ballistic flight path. The ballistic flight path may comprise a plurality of coordinates. The plurality of coordinates may, for example, comprise FFP location, maximum ordinate location, and target location. The plurality of coordinates may define a plurality of segments (390 and 391). Segment 390 may comprise a segment of a ballistic flight path from the FFP location to the maximum ordinate location. Segment 391 may comprise a segment of the ballistic flight path from the maximum ordinate location to the target location. The plurality of segments may approximate ballistic trajectory 306 in its entirety from FFP to target 303.

Figure 4:
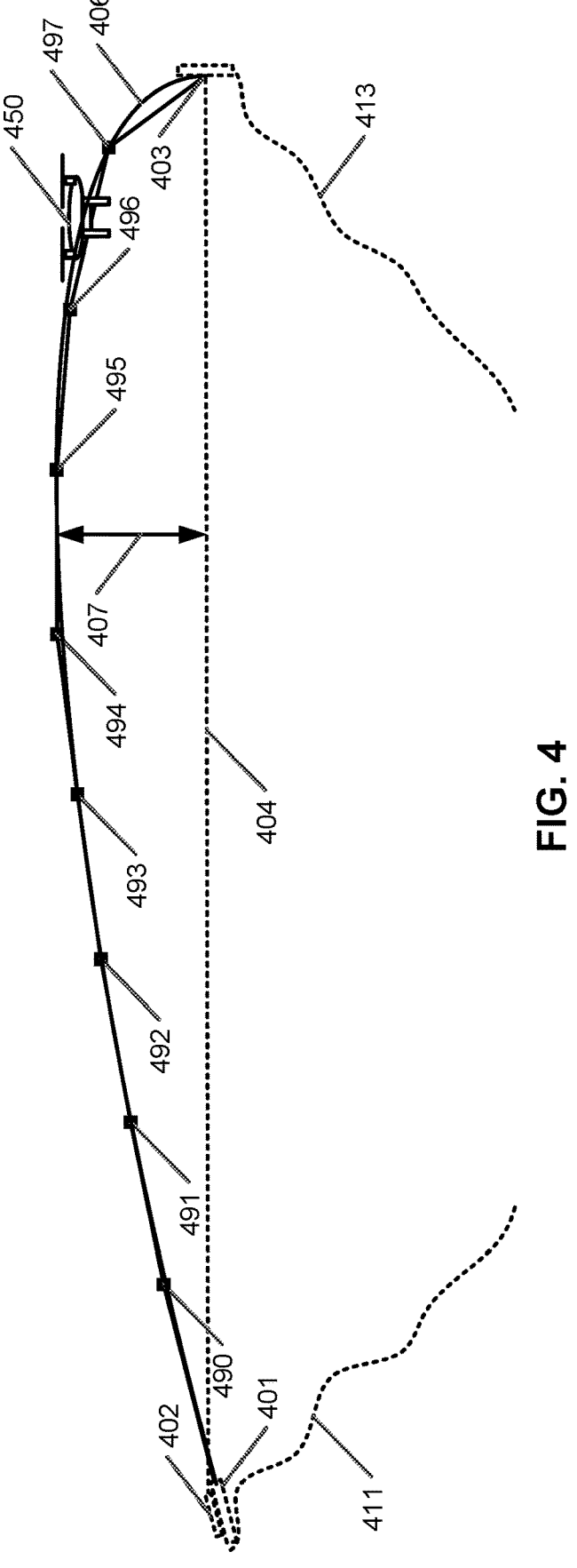
FIG. 4 illustrates an elevation view of an example UAV navigating along a second example ballistic flight path, consistent with disclosed embodiments.

FIG. 4 illustrates an elevation view of an example UAV 450 navigating along a second example ballistic flight path, consistent with disclosed embodiments. Ballistic trajectory 406 may be based on launching device 401. Sighting system 402 may be associated with launching device 401. Launching device 401 and sighting system 402 may be located at a FFP. The FFP may be located on FFP terrain 411. Target 403 may be located on target terrain 413. Line of sight 404 may comprise a line of sight from sighting system 402 to target 403. Ballistic trajectory 406 may comprise a maximum ordinate. Maximum ordinate height 407 may comprise the height above line of sight 404 at the maximum ordinate. Ballistic trajectory 406 may be converted into a ballistic flight path. The ballistic flight path may comprise a plurality of coordinates (490, 491, 492, 493, 494, 495, 496, and 497). The plurality of coordinates may approximate ballistic trajectory 406 in its entirety from FFP to target 403.

Figure 5:
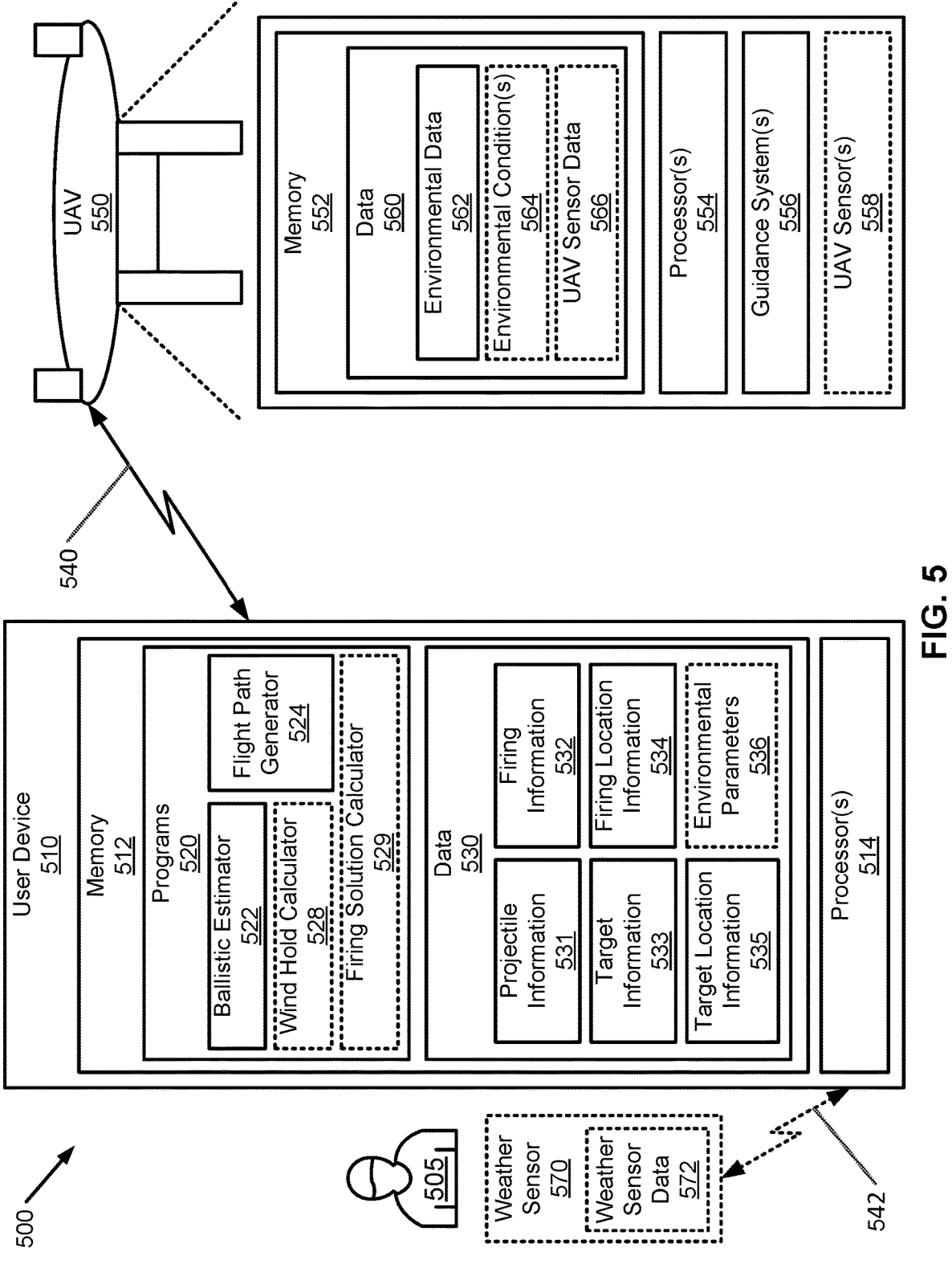
FIG. 5 is a block diagram of a first example system for collecting environmental data along a ballistic flight path, consistent with disclosed embodiments.

FIG. 5 is a block diagram of a first example system 500 for collecting environmental data 562 along a ballistic flight path, consistent with disclosed embodiments. System 500 may comprise UAV 550. UAV 550 may comprise memory 552, processor(s) 554, and Guidance System(s) 556. UAV 550 may also comprise UAV sensors 558. Memory 552 may be configured to store data 560. Data 560 may comprise environmental data 562. Data 560 may also comprise environmental condition(s) 564 and/or UAV sensor data 566. UAV 550 may be configured to communicate with user device 510 over network 540. User device 510 may comprise memory 512 and processor(s) 514. Memory 512 may comprise programs 520 and data 530. Programs 520 may comprise ballistic estimator 522 and flight path generator 524. Ballistic estimator 522 may comprise instructions to perform operations configured to estimate a ballistic trajectory of at least one projectile. The ballistic trajectory may be based on at least: projectile information 531, firing information 532, and target information 533. Flight path generator 524 may comprise instructions to perform operations configured to convert the ballistic trajectory into a ballistic flight path. Programs 520 may also comprise wind hold calculator 528 and/or firing solution calculator 529. Wind hold calculator 528 may comprise instructions to perform operations configured to calculate a wind hold value based on projectile information 531 and environmental data 562. Firing solution calculator 529 may comprise instructions to perform operations configured to calculate a firing solution based on projectile information 531, firing information 532, target information 533, and environmental data 562. Data 530 may comprise projectile information 531, firing information 532, target information 533, firing location information 534, and target location information 535. Data 530 may also comprise environmental parameters 536. User device 510 may be configured to be operable by user 505. User device 510 may be configured to communicate with weather sensor 570 via network 542. Weather sensor 570 may comprise weather sensor data 572. Weather sensor 570 may be configured to be operable by user 505. Weather sensor 570 may, for example, be employed by user 505 at a FFP.

Figure 6:
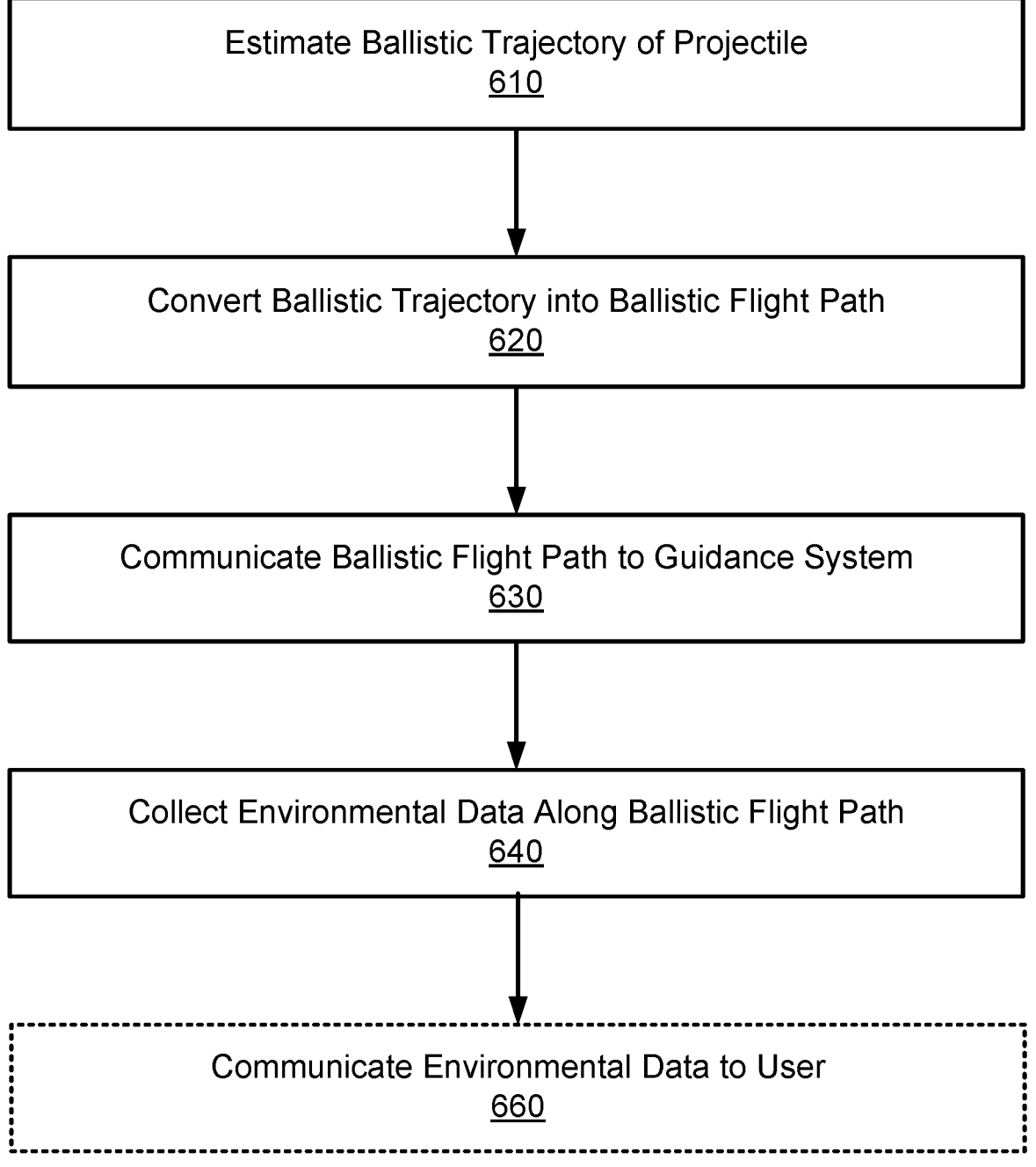
FIG. 6 is a flow diagram of a first example process for collecting environmental data along a ballistic flight path, consistent with disclosed embodiments.

FIG. 6 is a flow diagram of a first example process for collecting environmental data along a ballistic flight path, consistent with disclosed embodiments. An automated system for collecting environmental data along a ballistic trajectory may comprise at least one memory storing instructions. The automated system may comprise at least one processor being configured to execute the instructions to perform operations. The operations may comprise automatically estimating a ballistic trajectory of a projectile at 610. The ballistic trajectory may be based on at least: projectile information, firing information, and/or target information. The operations may comprise automatically converting the ballistic trajectory into a ballistic flight path at 620. The ballistic flight path may comprise a plurality of coordinates. The ballistic flight path may be based on at least: firing location information and target location information. The operations may comprise electronically communicating the ballistic flight path to a guidance system of a UAV at 630. The guidance system may be configured to cause the UAV to navigate along the ballistic flight path. The operations may comprise automatically collecting the environmental data along the ballistic flight path at 640. The operations may comprise automatically communicating the environmental data to a user at 660.

Figure 7:
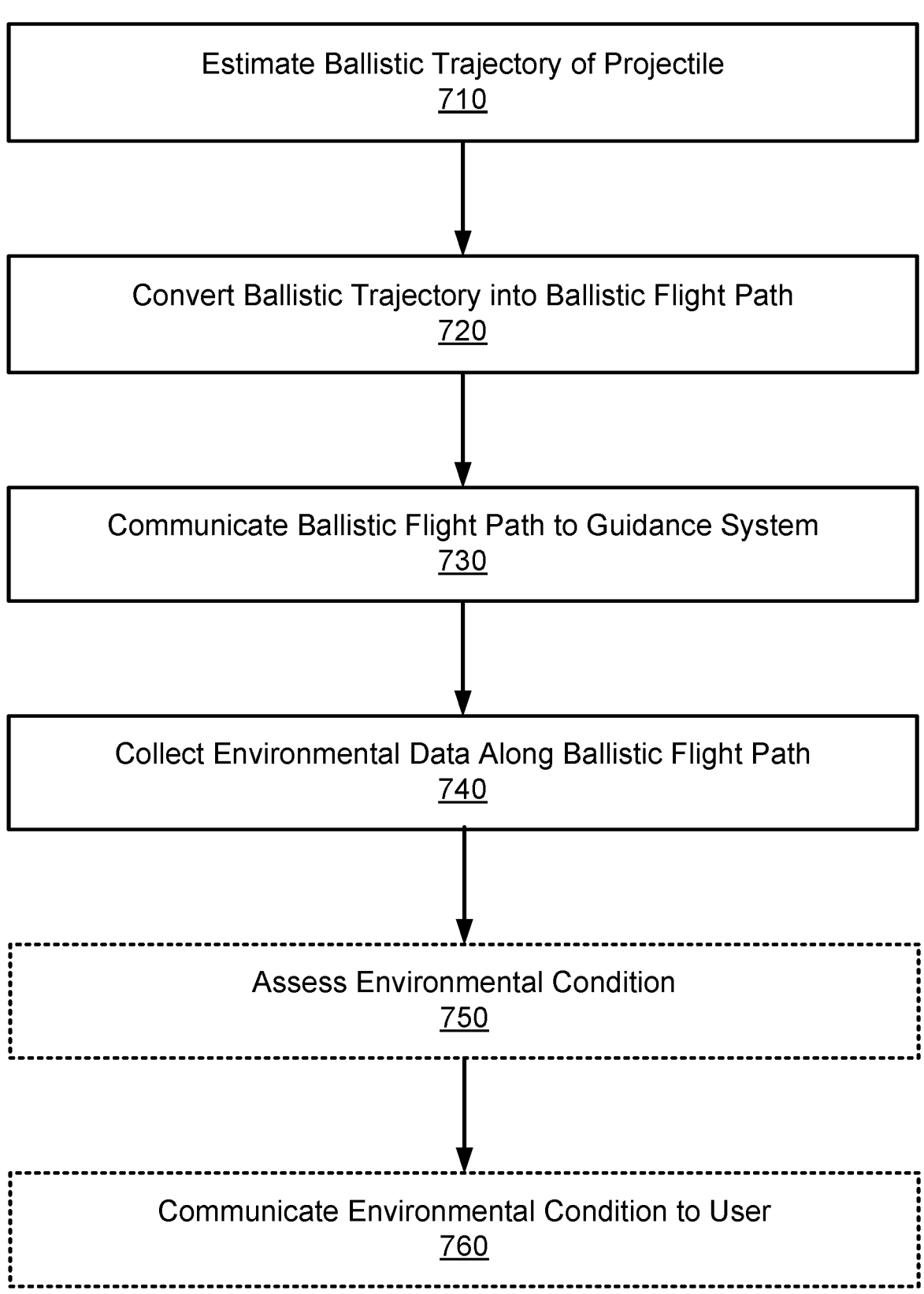
FIG. 7 is a flow diagram of a first example process for assessing an environmental condition along a ballistic flight path, consistent with disclosed embodiments.

FIG. 7 is a flow diagram of a first example process for assessing an environmental condition along a ballistic flight path, consistent with disclosed embodiments. An automated system for collecting environmental data along a ballistic trajectory may comprise at least one memory storing instructions. The automated system may comprise at least one processor being configured to execute the instructions to perform operations. The operations may comprise automatically estimating a ballistic trajectory of a projectile at 710. The ballistic trajectory may be based on at least: projectile information, firing information, and/or target information. The operations may comprise automatically converting the ballistic trajectory into a ballistic flight path at 720. The ballistic flight path may comprise a plurality of coordinates. The ballistic flight path may be based on at least: firing location information and target location information. The operations may comprise electronically communicating the ballistic flight path to a guidance system of a UAV at 730. The guidance system may be configured to cause the UAV to navigate along the ballistic flight path. The operations may comprise automatically collecting the environmental data along the ballistic flight path at 740. The operations may comprise automatically assessing an environmental condition at 750. The environmental condition may be based on the environmental data. The operations may comprise automatically communicating the environmental condition to a user at 760.

Figure 8:
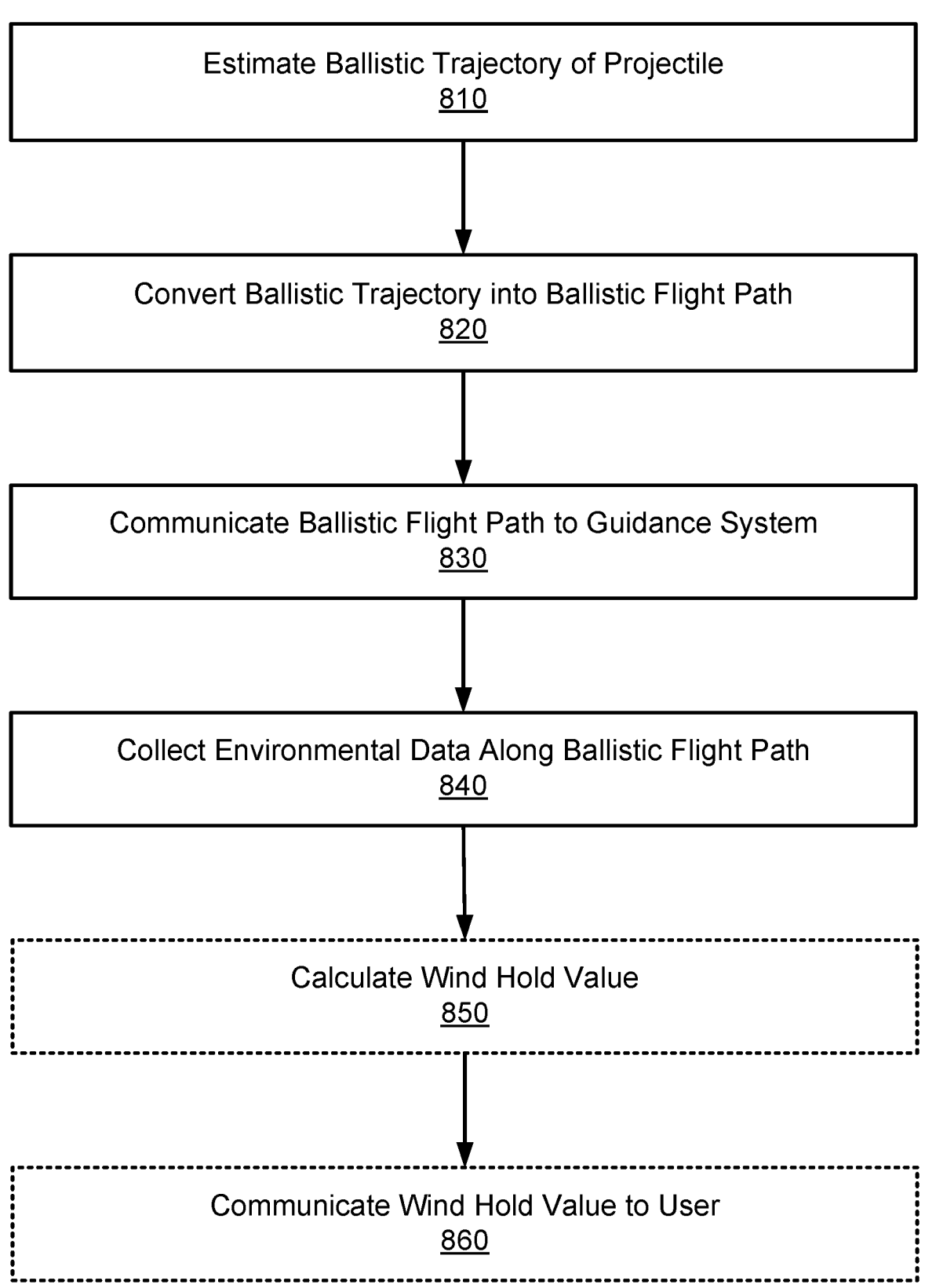
FIG. 8 is a flow diagram of a first example process for calculating a wind hold value based on environmental data collected along a ballistic flight path, consistent with disclosed embodiments.

FIG. 8 is a flow diagram of a first example process for calculating a wind hold value based on environmental data collected along a ballistic flight path, consistent with disclosed embodiments. An automated system for collecting environmental data along a ballistic trajectory may comprise at least one memory storing instructions. The automated system may comprise at least one processor being configured to execute the instructions to perform operations. The operations may comprise automatically estimating a ballistic trajectory of a projectile at 810. The ballistic trajectory may be based on at least: projectile information, firing information, and/or target information. The operations may comprise automatically converting the ballistic trajectory into a ballistic flight path at 820. The ballistic flight path may comprise a plurality of coordinates. The ballistic flight path may be based on at least: firing location information and target location information. The operations may comprise electronically communicating the ballistic flight path to a guidance system of a UAV at 830. The guidance system may be configured to cause the UAV to navigate along the ballistic flight path. The operations may comprise automatically collecting the environmental data along the ballistic flight path at 840. The operations may comprise automatically calculating a wind hold value at 850. The wind hold value may be based on projectile information and the environmental data. The operations may comprise automatically communicating the wind hold value to a user at 860.

Figure 9:
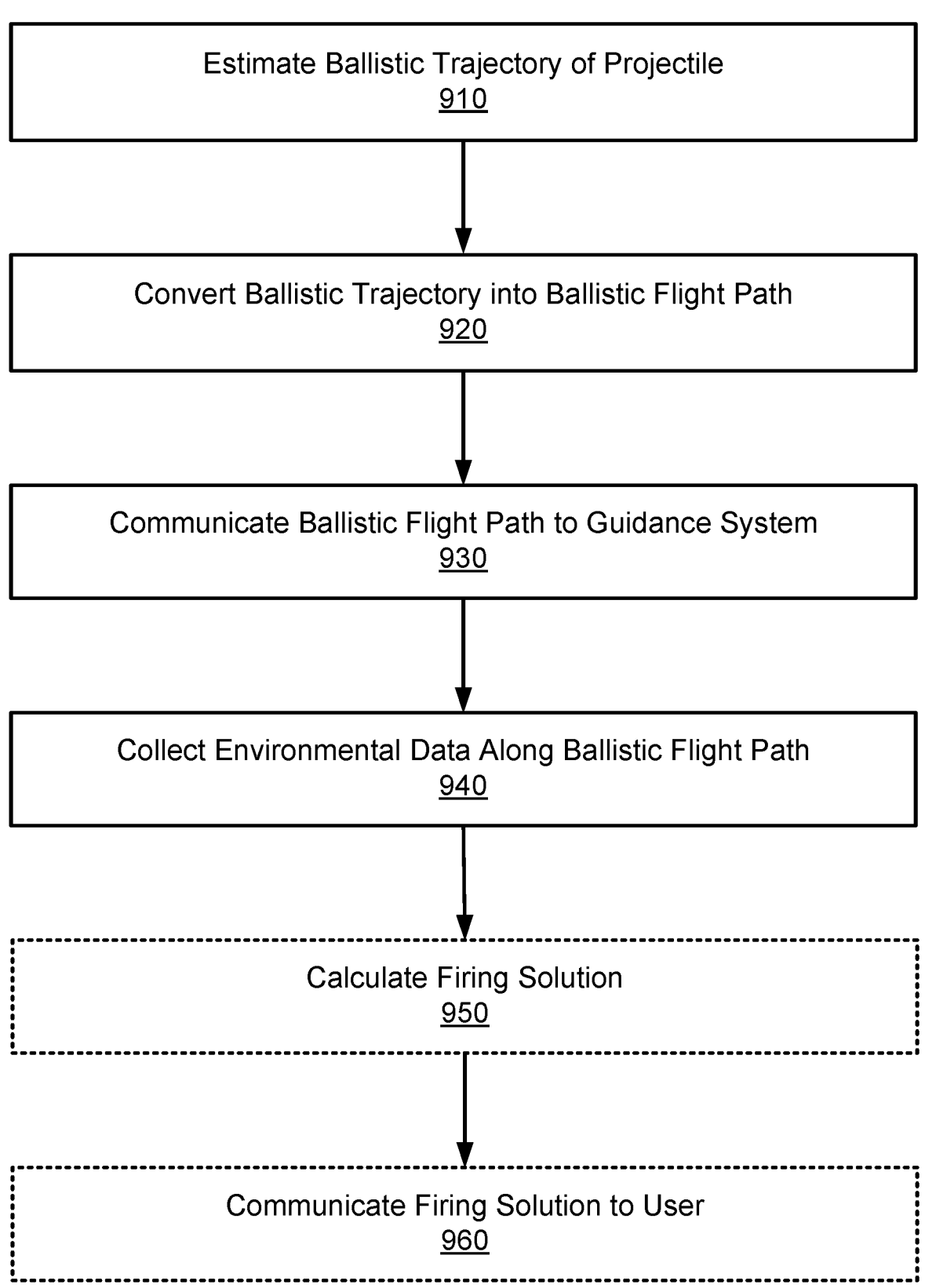
FIG. 9 is a flow diagram of a first example process for calculating a firing solution based on environmental data collected along a ballistic flight path, consistent with disclosed embodiments.

FIG. 9 is a flow diagram of a first example process for calculating a firing solution based on environmental data collected along a ballistic flight path, consistent with disclosed embodiments. An automated system for collecting environmental data along a ballistic trajectory may comprise at least one memory storing instructions. The automated system may comprise at least one processor being configured to execute the instructions to perform operations. The operations may comprise automatically estimating a ballistic trajectory of a projectile at 910. The ballistic trajectory may be based on at least: projectile information, firing information, and/or target information. The operations may comprise automatically converting the ballistic trajectory into a ballistic flight path at 920. The ballistic flight path may comprise a plurality of coordinates. The ballistic flight path may be based on at least: firing location information and target location information. The operations may comprise electronically communicating the ballistic flight path to a guidance system of a UAV at 930. The guidance system may be configured to cause the UAV to navigate along the ballistic flight path. The operations may comprise automatically collecting the environmental data along the ballistic flight path at 940. The operations may comprise automatically calculating a firing solution at 950. The firing solution may be based on projectile information, firing information, target information, and the environmental data. The operations may comprise automatically communicating the firing solution to a user at 960.

Figure 10:
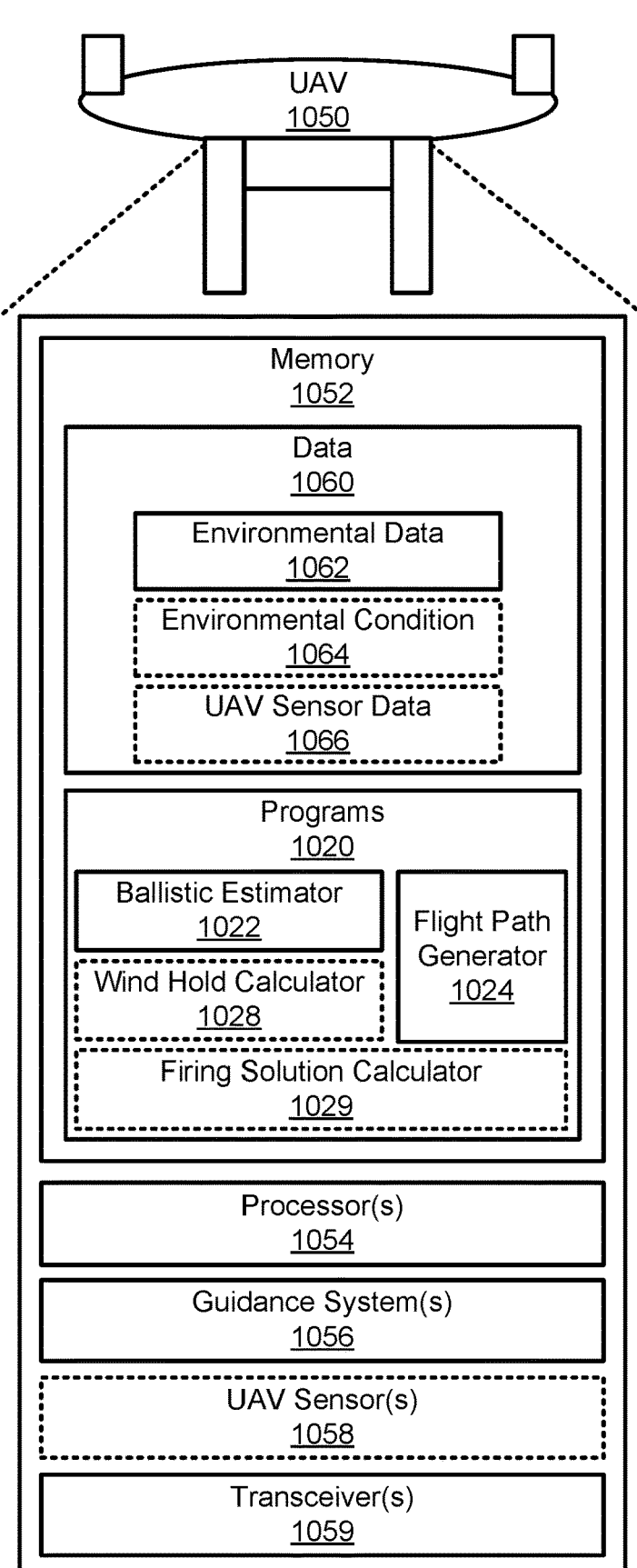
FIG. 10 is a block diagram of an example UAV for collecting environmental data along a ballistic flight path, consistent with disclosed embodiments.

FIG. 10 is a block diagram of an example UAV 1050 for collecting environmental data 1062 along a ballistic flight path, consistent with disclosed embodiments. UAV 1050 may comprise memory 1052, processor(s) 1054, Guidance System(s) 1056, and transceiver(s) 1059. Transceiver(s) 1059 may be configured to communicate with user device(s) and/or a weather sensor(s). UAV 1050 may also comprise UAV sensors 1058. Memory 1052 may be configured to store data 1060. Data 1060 may comprise environmental data 1062. Data 1060 may also comprise environmental condition(s) 1064 and/or UAV sensor data 1066. Memory 1052 may comprise programs 1020. Programs 1020 may comprise ballistic estimator 1022 and flight path generator 1024. Programs 1020 may also comprise wind hold calculator 1028 and/or firing solution calculator 1029.

Figure 11:
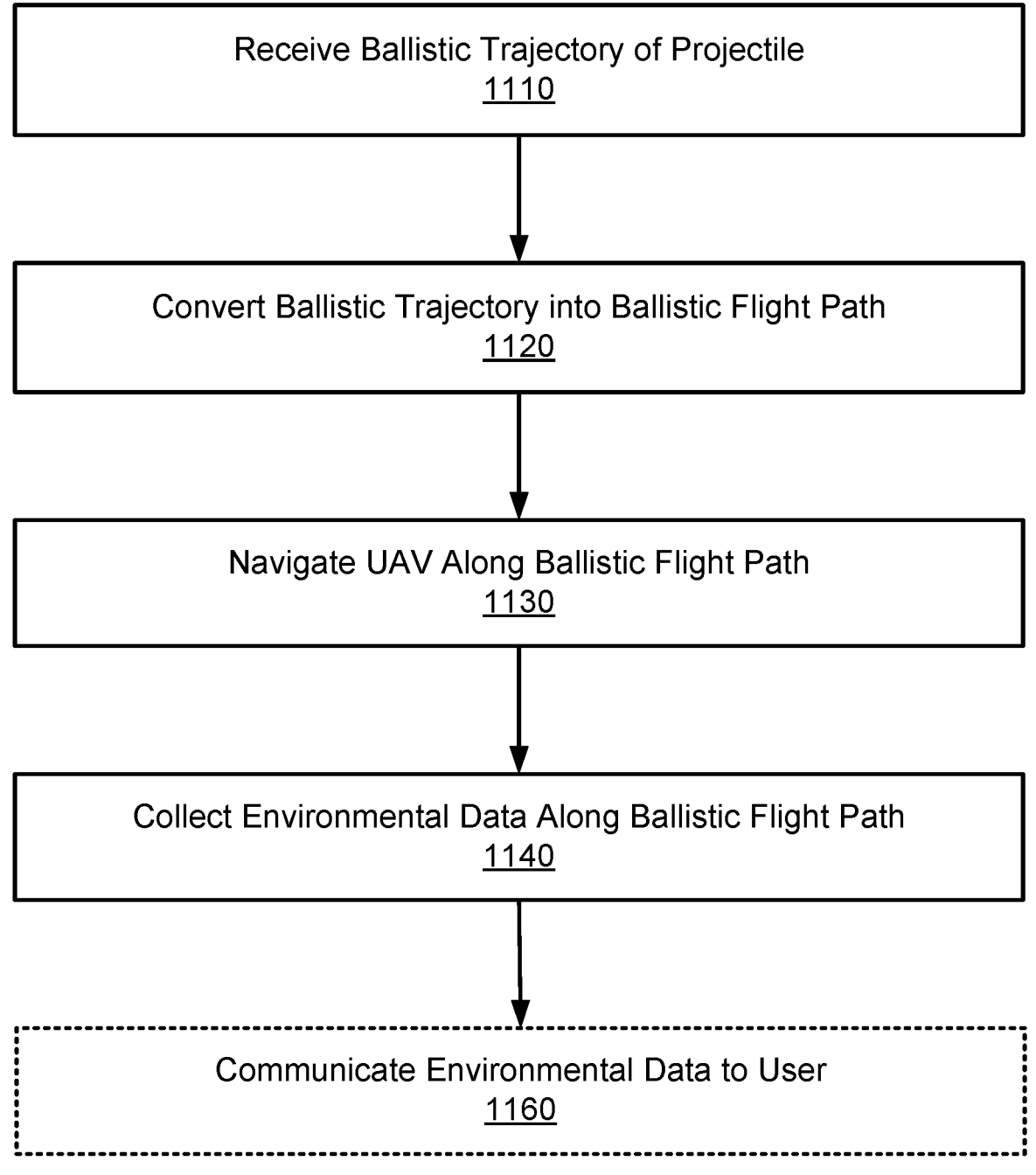
FIG. 11 is a flow diagram of a second example process for collecting environmental data along a ballistic flight path, consistent with disclosed embodiments.

FIG. 11 is a flow diagram of a second example process for collecting environmental data along a ballistic flight path, consistent with disclosed embodiments. A UAV for collecting environmental data along a ballistic trajectory may comprise at least one memory storing instructions. The UAV may comprise at least one processor being configured to execute the instructions to perform operations. The operations may comprise automatically receiving the ballistic trajectory of a projectile at 1110. The ballistic trajectory may be based on at least: projectile information, firing information, and/or target information. The operations may comprise automatically converting the ballistic trajectory into a ballistic flight path at 1120. The ballistic flight path may comprise a plurality of coordinates. The ballistic flight path may be based on at least: firing location information and target location information. The operations may comprise automatically navigating the UAV along the ballistic flight path at 1130. The operations may comprise automatically collecting the environmental data along the ballistic flight path at 1140. The operations may comprise automatically communicating the environmental data to a user at 1160.

Figure 12:
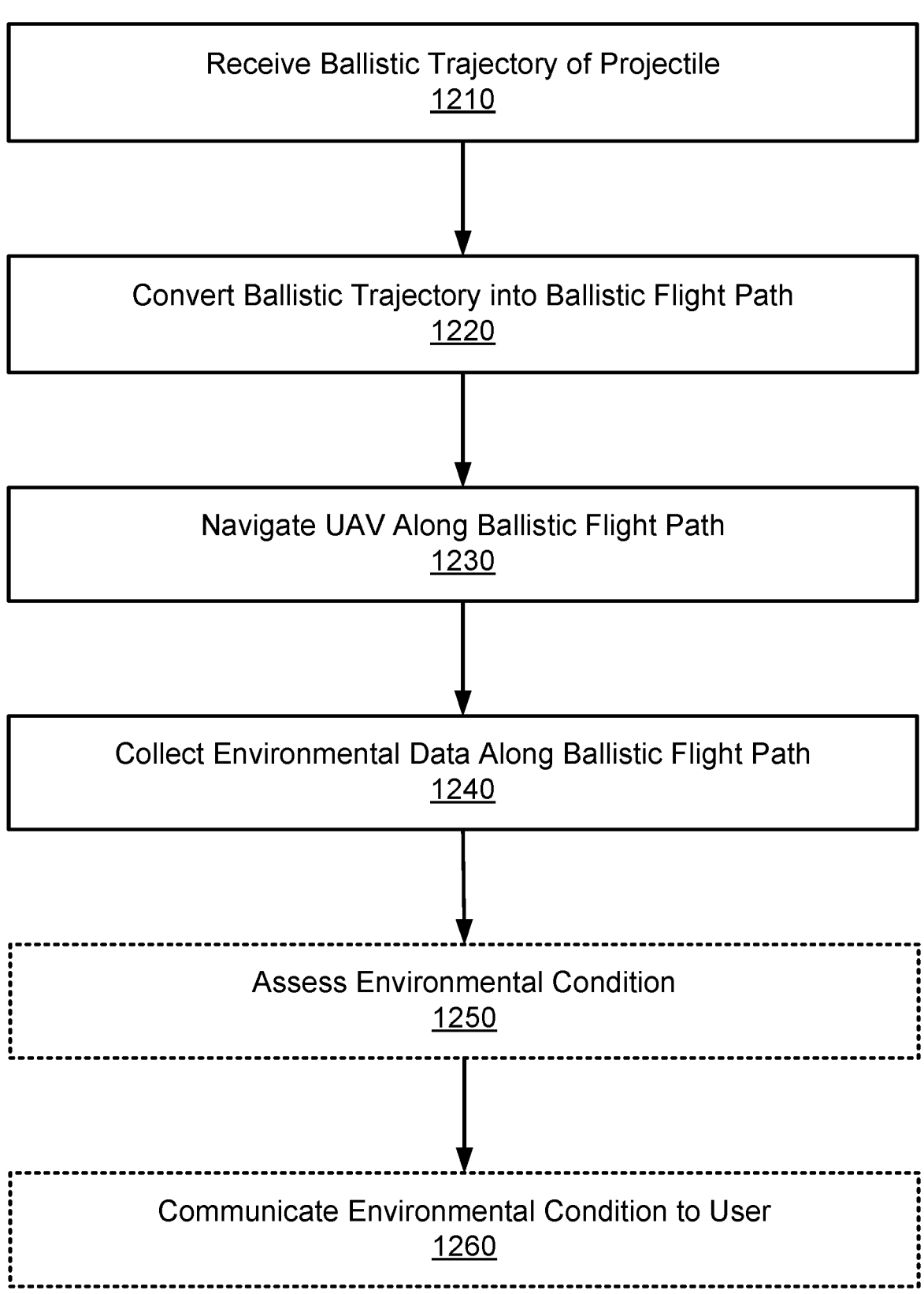
FIG. 12 is a flow diagram of a second example process for assessing an environmental condition along a ballistic flight path, consistent with disclosed embodiments.

FIG. 12 is a flow diagram of a second example process for assessing an environmental condition along a ballistic flight path, consistent with disclosed embodiments. A UAV for collecting environmental data along a ballistic trajectory may comprise at least one memory storing instructions. The UAV may comprise at least one processor being configured to execute the instructions to perform operations. The operations may comprise automatically receiving the ballistic trajectory of a projectile at 1210. The operations may comprise automatically converting the ballistic trajectory into a ballistic flight path at 1220. The operations may comprise automatically navigating the UAV along the ballistic flight path at 1230. The operations may comprise automatically collecting the environmental data along the ballistic flight path at 1240. The operations may comprise automatically assessing an environmental condition at 1250. The environmental condition may be based on the environmental data. The operations may comprise automatically communicating the environmental condition to a user at 1260.

Figure 13:
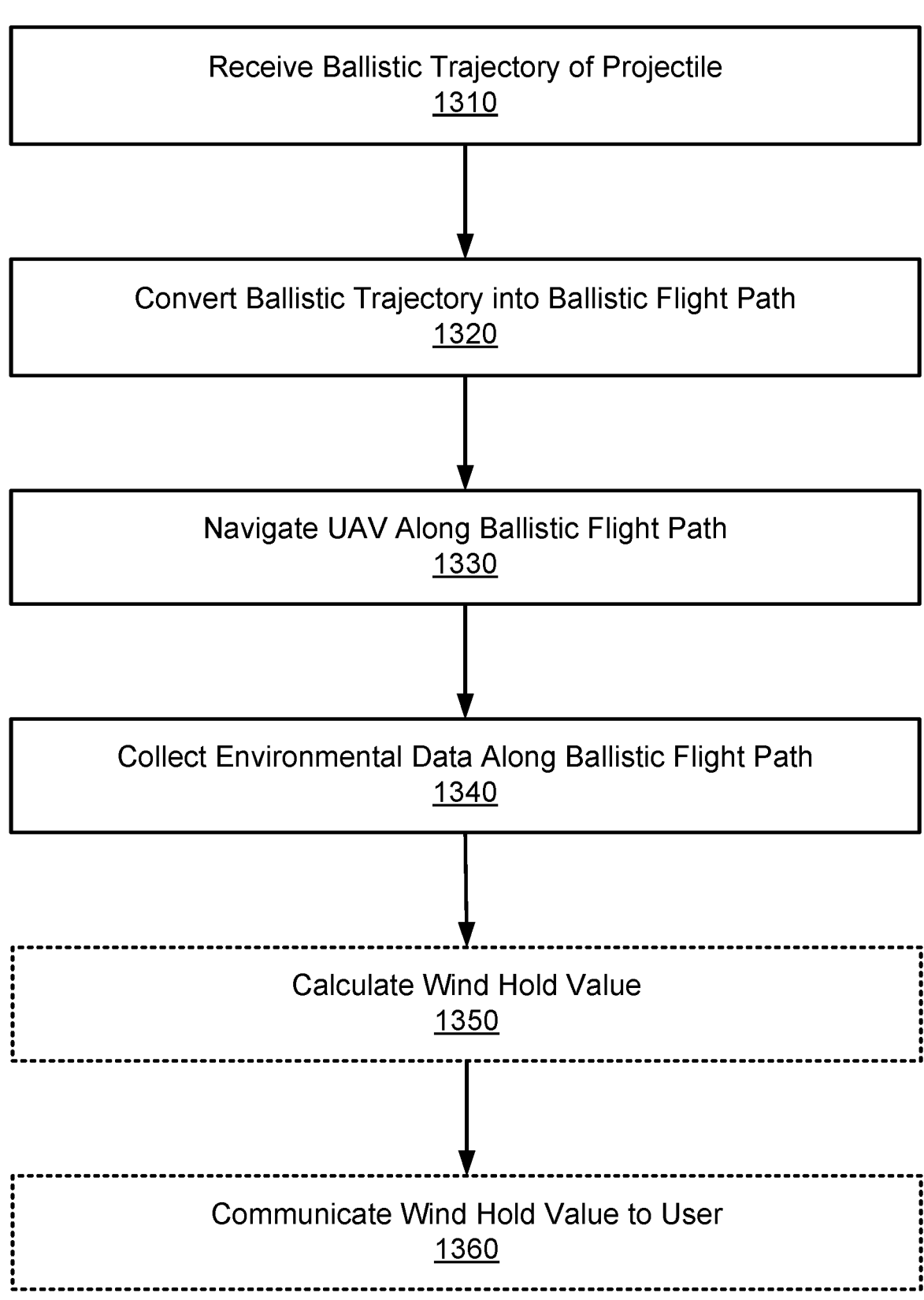
FIG. 13 is a flow diagram of a second example process for calculating a wind hold value based on environmental data collected along a ballistic flight path, consistent with disclosed embodiments.

FIG. 13 is a flow diagram of a second example process for calculating a wind hold value based on environmental data collected along a ballistic flight path, consistent with disclosed embodiments. A UAV for collecting environmental data along a ballistic trajectory may comprise at least one memory storing instructions. The UAV may comprise at least one processor being configured to execute the instructions to perform operations. The operations may comprise automatically receiving the ballistic trajectory of a projectile at 1310. The operations may comprise automatically converting the ballistic trajectory into a ballistic flight path at 1320. The operations may comprise automatically navigating the UAV along the ballistic flight path at 1330. The operations may comprise automatically collecting the environmental data along the ballistic flight path at 1340. The operations may comprise automatically calculating a wind hold value at 1350. The wind hold value may be based on projectile information and the environmental data. The operations may comprise automatically communicating the wind hold value to a user at 1360.

Figure 14:
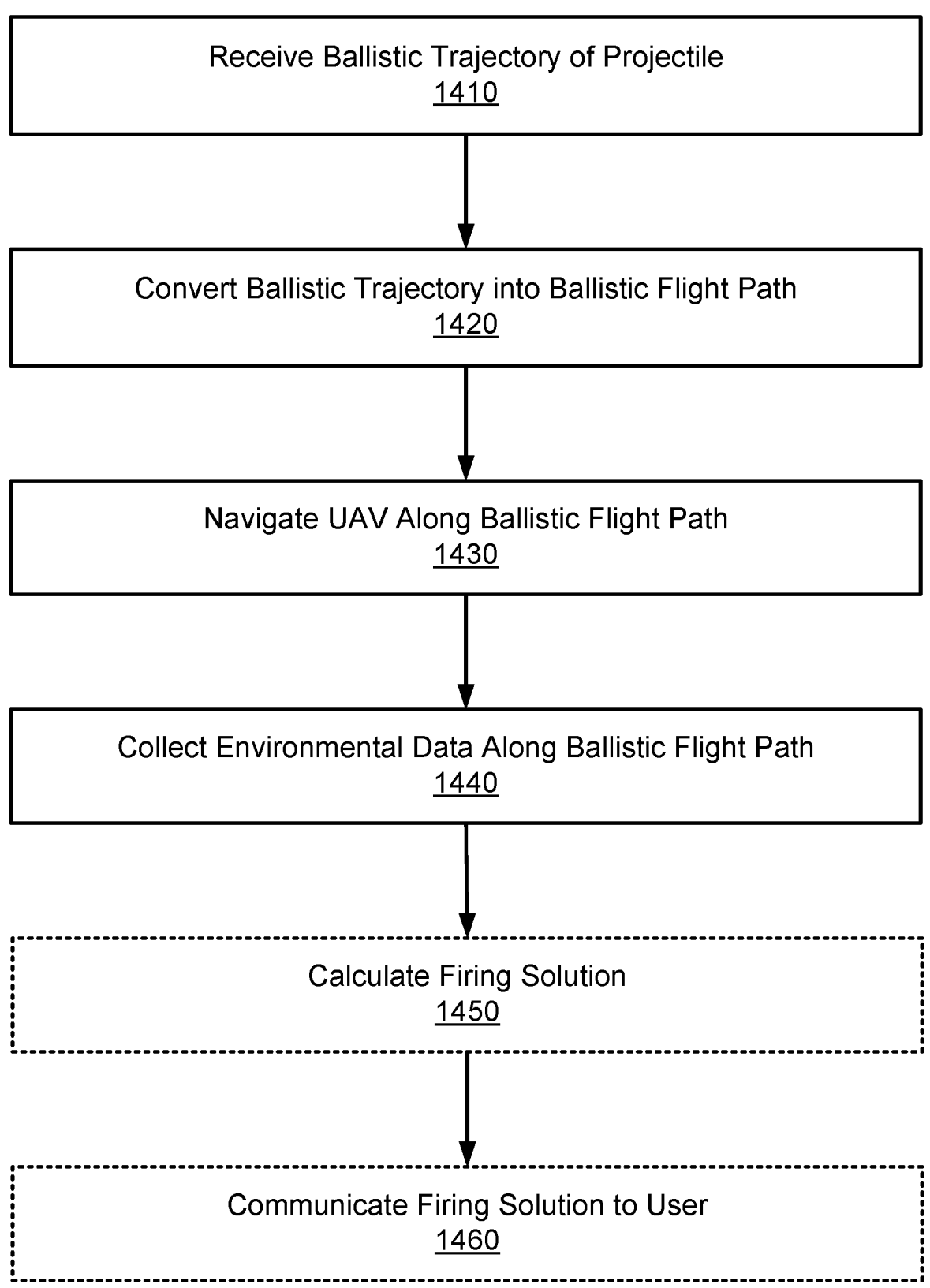
FIG. 14 is a flow diagram of a second example process for calculating a firing solution based on environmental data collected along a ballistic flight path, consistent with disclosed embodiments.

FIG. 14 is a flow diagram of a second example process for calculating a firing solution based on environmental data collected along a ballistic flight path, consistent with disclosed embodiments. A UAV for collecting environmental data along a ballistic trajectory may comprise at least one memory storing instructions. The UAV may comprise at least one processor being configured to execute the instructions to perform operations. The operations may comprise automatically receiving the ballistic trajectory of a projectile at 1410. The operations may comprise automatically converting the ballistic trajectory into a ballistic flight path at 1420. The operations may comprise automatically navigating the UAV along the ballistic flight path at 1430. The operations may comprise automatically collecting the environmental data along the ballistic flight path at 1440. The operations may comprise automatically calculating a firing solution at 1450. The firing solution may be based on projectile information, firing information, target information, and the environmental data. The operations may comprise automatically communicating the firing solution to a user at 1460.

Figure 15:
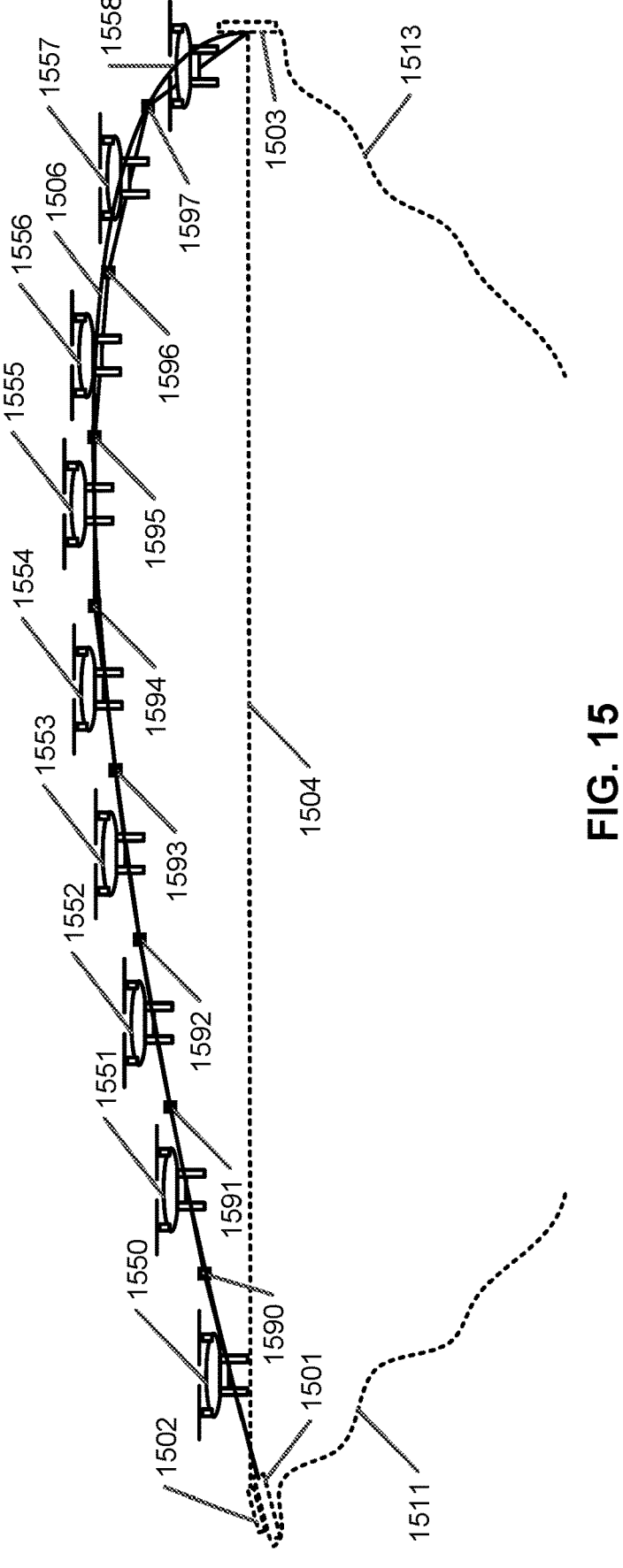
FIG. 15 illustrates an elevation view of a plurality of example UAVs navigating along a plurality of example path segments, consistent with disclosed embodiments.

FIG. 15 illustrates an elevation view of a plurality of example UAVs (1550, 1551, 1552, 1553, 1554, 1555, 1556, 1557, 1558) navigating along a plurality of example path segments, consistent with disclosed embodiments. Ballistic trajectory 1506 may be based on launching device 1501. Sighting system 1502 may be associated with launching device 1501. Launching device 1501 and sighting system 1502 may be located at a FFP. The FFP may be located on FFP terrain 1511. Target 1503 may be located on target terrain 1513. Line of sight 1504 may comprise a line of sight from sighting system 1502 to target 1503. Ballistic trajectory 1506 may be converted into a ballistic flight path. The ballistic flight path may comprise a plurality of coordinates (1590, 1591, 1592, 1593, 1594, 1595, 1596, and 1597). The plurality of coordinates may include a location of the FFP and/or the location of the target 1503. The plurality of coordinates may approximate ballistic trajectory 1506 in its entirety from FFP to target 1503. The plurality of coordinates (1590, 1591, 1592, 1593, 1594, 1595, 1596, and 1597) may define a plurality of path segments. Each of the UAVs (1550, 1551, 1552, 1553, 1554, 1555, 1556, 1557, 1558) may be configured to navigate along a flight path that includes at least one of the path segments. For example, UAV 1550 may be configured to navigate along a path segment defined by the location of the FFP and coordinate 1590. In another example, UAV 1551 may be configured to navigate along a path segment defined by coordinates 1590 and 1591, and so on. In a final example, UAV 1558 may be configured to navigate along a path segment defined by coordinate 1597 and the location of the target 1503.

Figure 16:
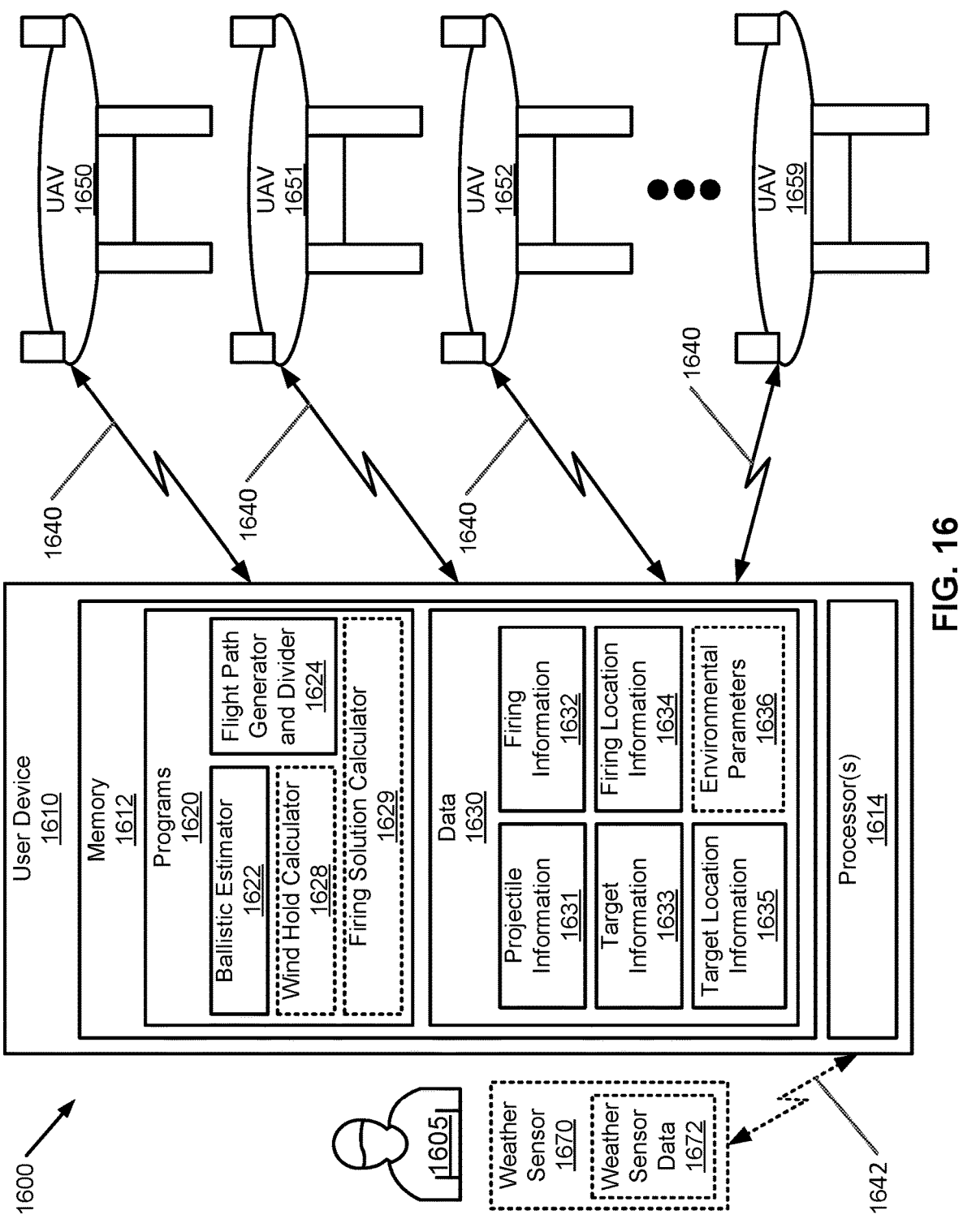
FIG. 16 is a block diagram of a second example system for collecting environmental data along a ballistic flight path, consistent with disclosed embodiments.

FIG. 16 is a block diagram of a second example system 1600 for collecting environmental data along a ballistic flight path, consistent with disclosed embodiments. System 1600 may comprise a plurality of UAVs (1650, 1651, 1652, . . . 1659). Each of the plurality of UAVs (1650, 1651, 1652, . . . 1659) may comprise at least one memory, at least one processor, and at least one Guidance System. Each of the plurality of UAVs (1650, 1651, 1652, . . . 1659) may also comprise one or more UAV sensors. Each of the plurality of UAVs (1650, 1651, 1652, . . . 1659) may be configured similarly to UAV 550 described above. Each of the plurality of UAVs (1650, 1651, 1652, . . . 1659) may be configured to communicate with user device 1610 over network 1640. User device 1610 may comprise memory 1612 and processor(s) 1614. Memory 1612 may comprise programs 1620 and data 1630. Programs 1620 may comprise ballistic estimator 1622 and flight path generator 1624. Ballistic estimator 1622 may comprise instructions to perform operations configured to estimate a ballistic trajectory of at least one projectile. Flight path generator 1624 may comprise instructions to perform operations configured to convert the ballistic trajectory into a ballistic flight path, and divide the ballistic flight path into a plurality of path segments. Programs 1620 may also comprise wind hold calculator 1628 and/or firing solution calculator 1629. Data 1630 may comprise projectile information 1631, firing information 1632, target information 1633, firing location information 1634, and target location information 1635. Data 1630 may also comprise environmental parameters 1636. User device 1610 may be configured to be operable by user 1605. User device 1610 may be configured to communicate with weather sensor 1670 via network 1642. Weather sensor 1670 may comprise weather sensor data 1672. Weather sensor 1670 may be configured to be operable by user 1605. Weather sensor 1670 may, for example, be employed by user 1605 at a FFP.

Figure 17:
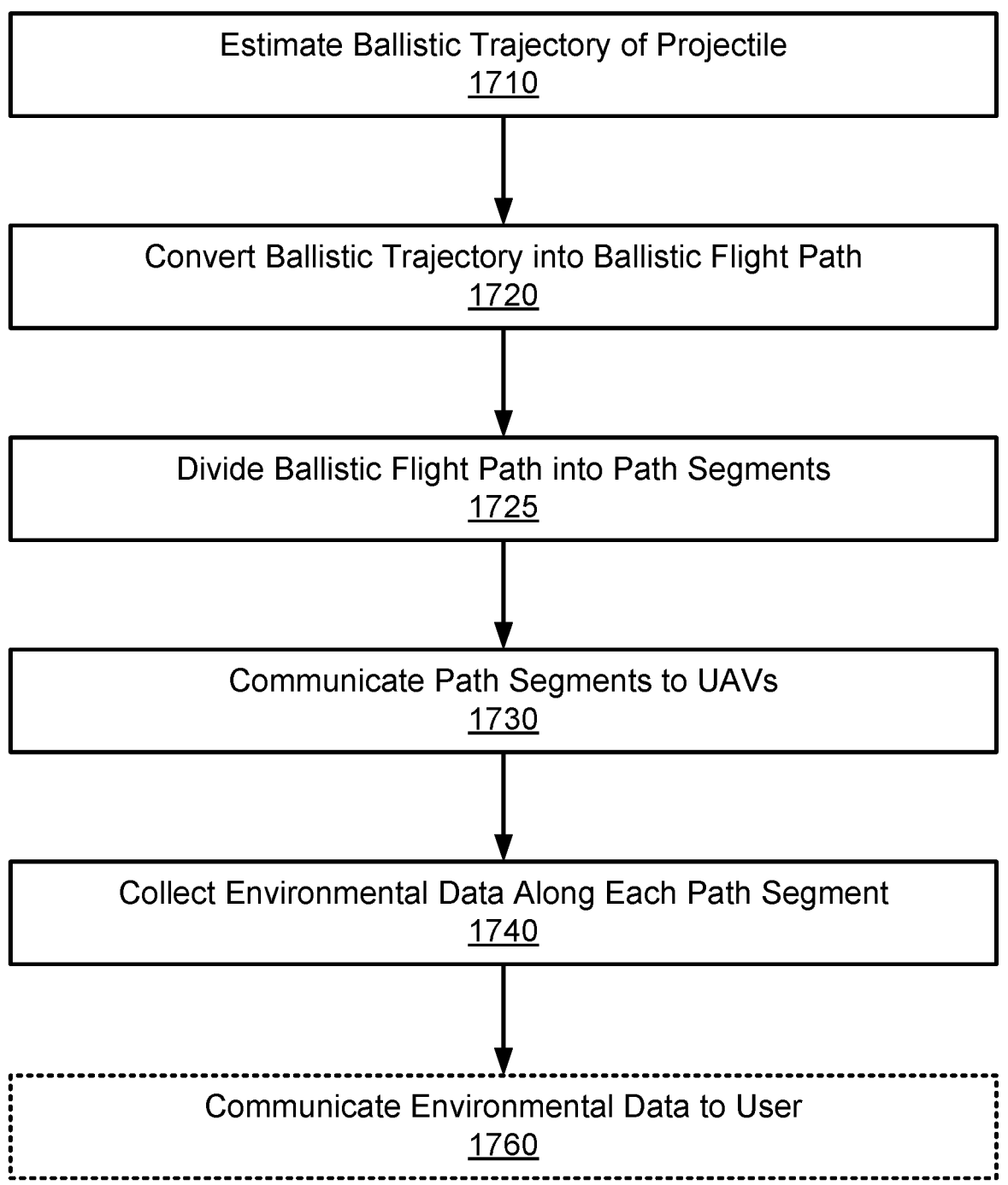
FIG. 17 is a flow diagram of a third example process for collecting environmental data along a ballistic flight path, consistent with disclosed embodiments.

FIG. 17 is a flow diagram of a third example process for collecting environmental data along a ballistic flight path, consistent with disclosed embodiments. A system for collecting environmental data along a ballistic flight path may comprise a plurality of UAVs. The system may comprise at least one memory storing instructions. The system may comprise at least one processor being configured to execute the instructions to perform operations. The operations may comprise automatically estimating the ballistic trajectory of a projectile at 1710. The ballistic trajectory may be based on at least: projectile information, firing information, and/or target information. The operations may comprise automatically converting the ballistic trajectory into a ballistic flight path at 1720. The ballistic flight path may comprise a plurality of coordinates. The ballistic flight path may be based on at least: firing location information and target location information. The operations may comprise dividing the ballistic flight path into a plurality of path segments at 1725. The operations may comprise automatically communicating the path segments to a plurality of UAVs at 1730. Each of the UAVs may be configured to navigate along a flight path that includes one of the path segments. The operations may comprise automatically collecting environmental data along each of the path segments at 1740. The operations may comprise automatically communicating the environmental data to a user at 1760.

Figure 18:
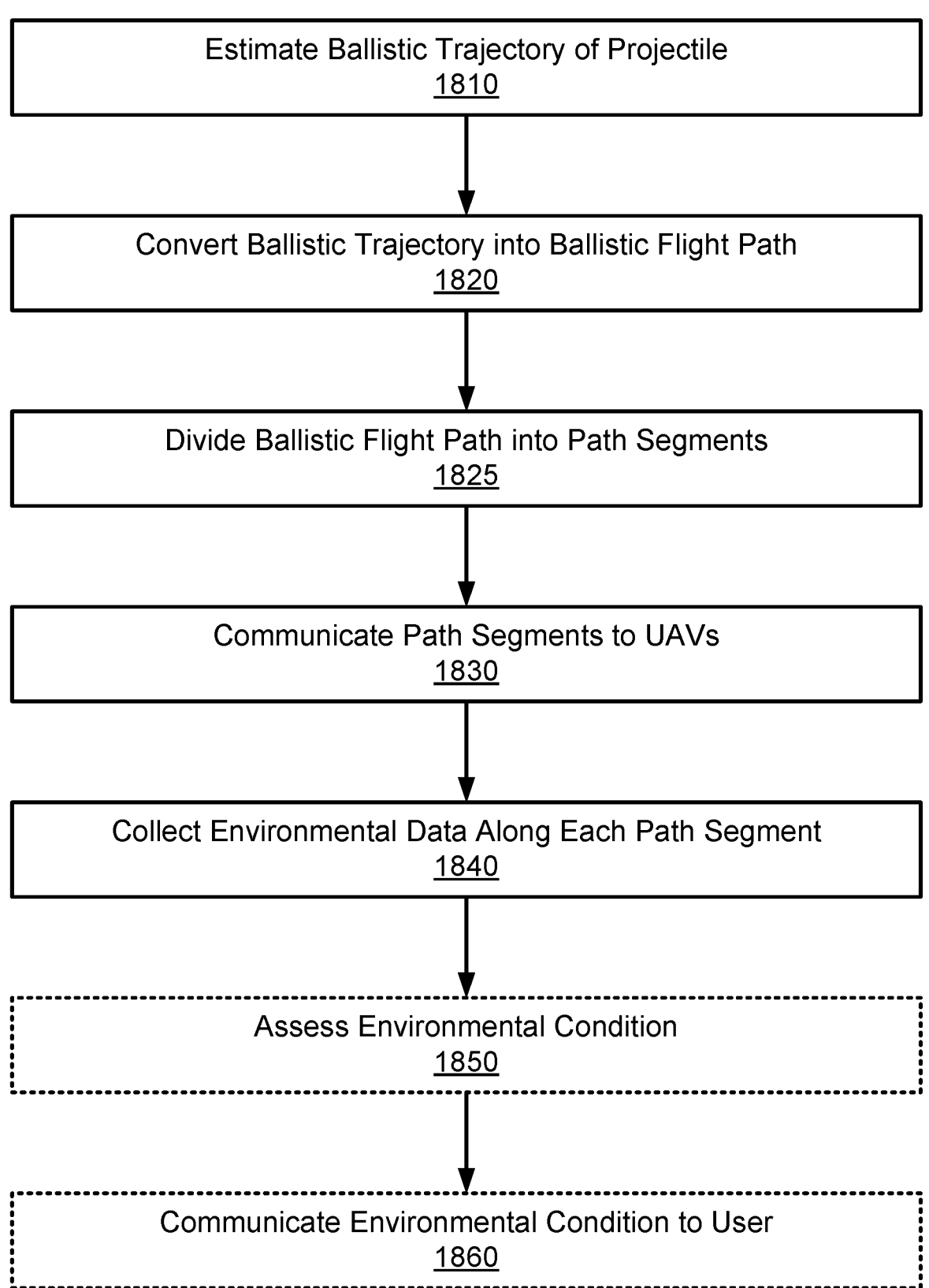
FIG. 18 is a flow diagram of a third example process for assessing an environmental condition along a ballistic flight path, consistent with disclosed embodiments.

FIG. 18 is a flow diagram of a third example process for assessing an environmental condition along a ballistic flight path, consistent with disclosed embodiments. A system for collecting environmental data along a ballistic flight path may comprise a plurality of UAVs. The system may comprise at least one memory storing instructions. The system may comprise at least one processor being configured to execute the instructions to perform operations. The operations may comprise automatically estimating the ballistic trajectory of a projectile at 1810. The ballistic trajectory may be based on at least: projectile information, firing information, and/or target information. The operations may comprise automatically converting the ballistic trajectory into a ballistic flight path at 1820. The ballistic flight path may comprise a plurality of coordinates. The ballistic flight path may be based on at least: firing location information and target location information. The operations may comprise dividing the ballistic flight path into a plurality of path segments at 1825. The operations may comprise automatically communicating the path segments to a plurality of UAVs at 1830. Each of the UAVs may be configured to navigate along a flight path that includes one of the path segments. The operations may comprise automatically collecting environmental data along each of the path segments at 1840. The operations may comprise automatically assessing an environmental condition at 1850. The environmental condition may be based on the environmental data collected along the plurality of path segments. The operations may comprise automatically communicating the environmental condition to a user at 1860.

Figure 19:
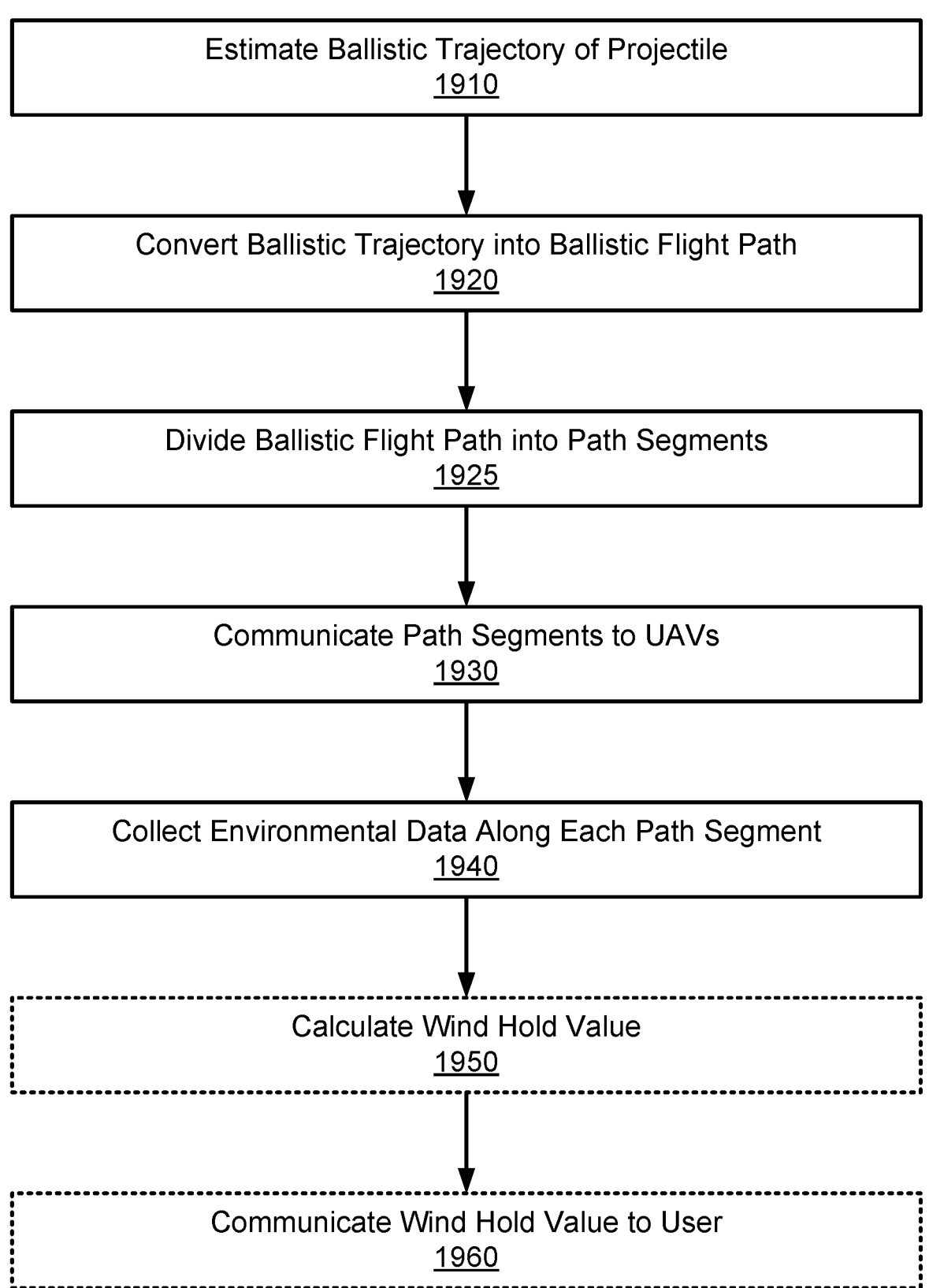
FIG. 19 is a flow diagram of a third example process for calculating a wind hold value based on environmental data collected along a ballistic flight path, consistent with disclosed embodiments.

FIG. 19 is a flow diagram of a third example process for calculating a wind hold value based on environmental data collected along a ballistic flight path, consistent with disclosed embodiments. A system for collecting environmental data along a ballistic flight path may comprise a plurality of UAVs. The system may comprise at least one memory storing instructions. The system may comprise at least one processor being configured to execute the instructions to perform operations. The operations may comprise automatically estimating the ballistic trajectory of a projectile at 1910. The ballistic trajectory may be based on at least: projectile information, firing information, and/or target information. The operations may comprise automatically converting the ballistic trajectory into a ballistic flight path at 1920. The ballistic flight path may comprise a plurality of coordinates. The ballistic flight path may be based on at least: firing location information and target location information. The operations may comprise dividing the ballistic flight path into a plurality of path segments at 1925. The operations may comprise automatically communicating the path segments to a plurality of UAVs at 1930. Each of the UAVs may be configured to navigate along a flight path that includes one of the path segments. The operations may comprise automatically collecting environmental data along each of the path segments at 1940. The operations may comprise automatically calculating a wind hold value at 1950. The wind hold value may be based on projectile information and the environmental data collected along the plurality of path segments. The operations may comprise automatically communicating the wind hold value to a user at 1960.

Figure 20:
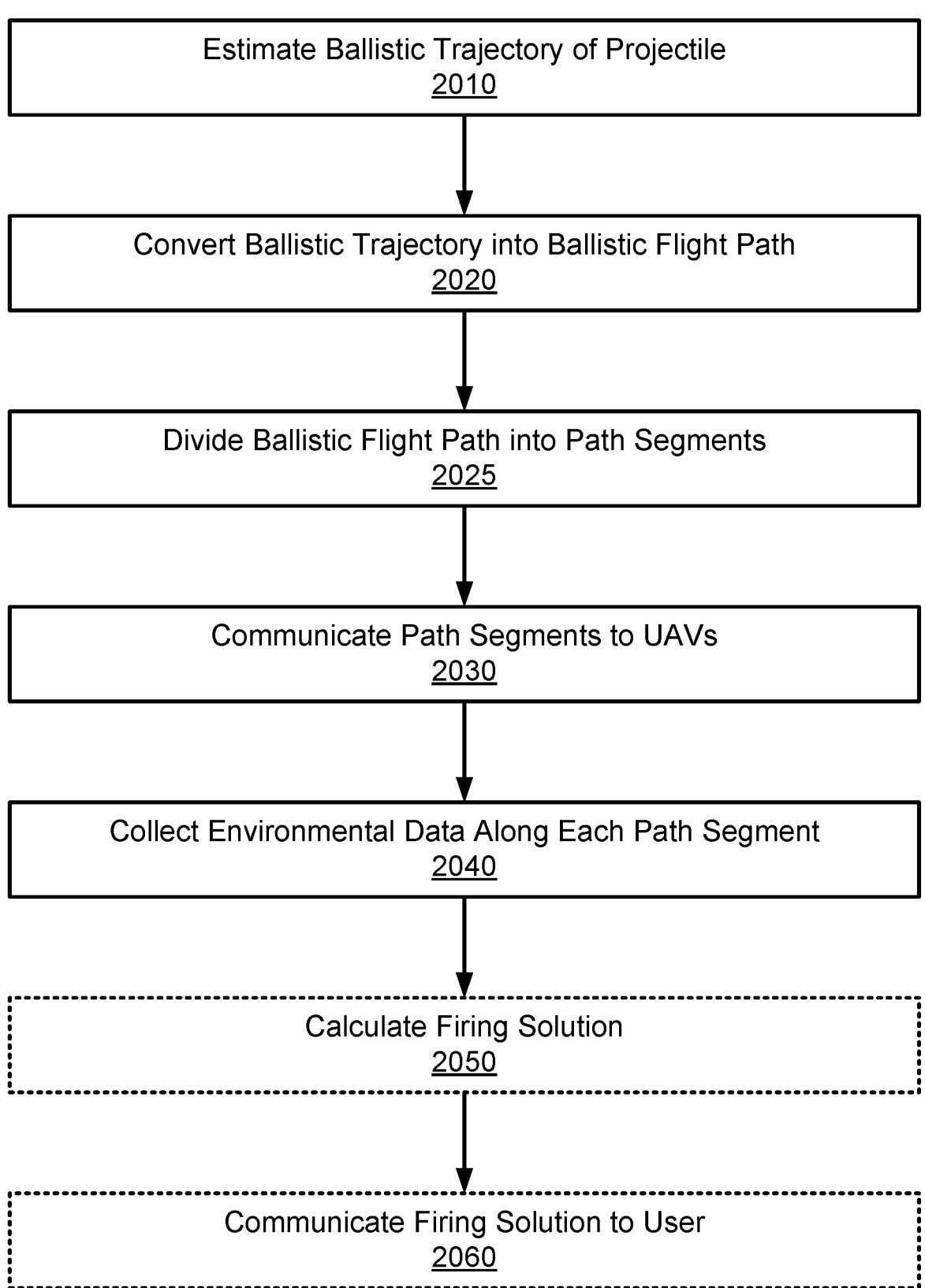
FIG. 20 is a flow diagram of a third example process for calculating a firing solution based on environmental data collected along a ballistic flight path, consistent with disclosed embodiments.

FIG. 20 is a flow diagram of a third example process for calculating a firing solution based on environmental data collected along a ballistic flight path, consistent with disclosed embodiments. A system for collecting environmental data along a ballistic flight path may comprise a plurality of UAVs. The system may comprise at least one memory storing instructions. The system may comprise at least one processor being configured to execute the instructions to perform operations. The operations may comprise automatically estimating the ballistic trajectory of a projectile at 2010. The ballistic trajectory may be based on at least: projectile information, firing information, and/or target information. The operations may comprise automatically converting the ballistic trajectory into a ballistic flight path at 2020. The ballistic flight path may comprise a plurality of coordinates. The ballistic flight path may be based on at least: firing location information and target location information. The operations may comprise dividing the ballistic flight path into a plurality of path segments at 2025. The operations may comprise automatically communicating the path segments to a plurality of UAVs at 2030. Each of the UAVs may be configured to navigate along a flight path that includes one of the path segments. The operations may comprise automatically collecting environmental data along each of the path segments at 2040. The operations may comprise automatically calculating a firing solution at 2050. The firing solution may be based on projectile information, firing information, target information, and the environmental data collected along the plurality of path segments. The operations may comprise automatically communicating the firing solution to a user at 2060.

Figure 21:
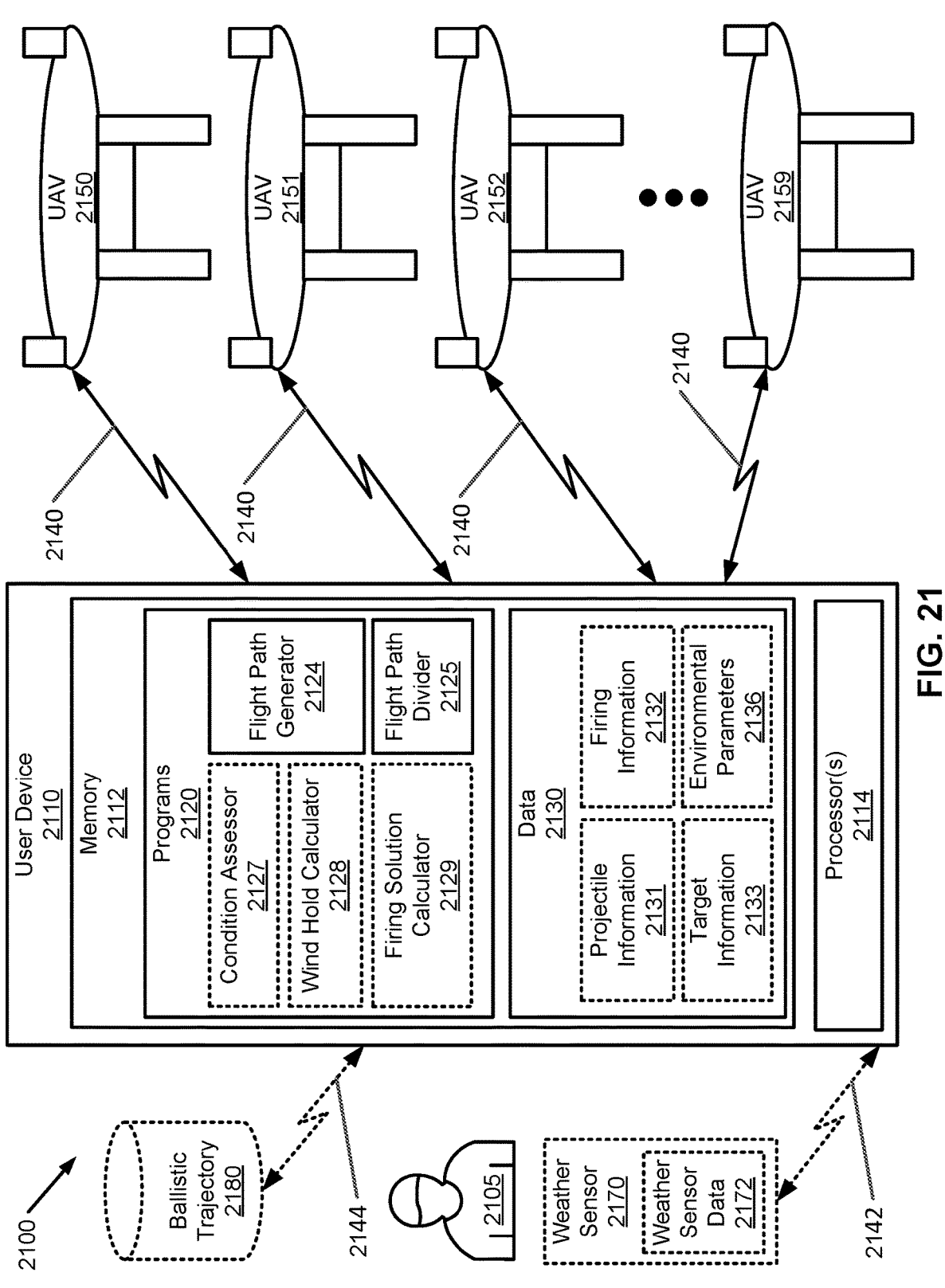
FIG. 21 is a block diagram of a third example system for collecting environmental data along a ballistic flight path, consistent with disclosed embodiments.

FIG. 21 is a block diagram of a third example system 2100 for collecting environmental data along a ballistic flight path, consistent with disclosed embodiments. System 2100 may comprise a plurality of UAVs (2150, 2151, 2152, . . . 2159). Each of the plurality of UAVs (2150, 2151, 2152, . . . 2159) may comprise at least one memory, at least one processor, and at least one Guidance System. Each of the plurality of UAVs (2150, 2151, 2152, . . . 2159) may also comprise one or more UAV sensors. Each of the plurality of UAVs (2150, 2151, 2152, . . . 2159) may be configured similarly to UAV 550 described above. Each of the plurality of UAVs (2150, 2151, 2152, . . . 2159) may be configured to communicate with user device 2110 over network 2140.

User device 2110 may be configured to receive a ballistic trajectory from ballistic trajectory data store 2180. Ballistic trajectory data store 2180 may be accessible to user device 2110 via network 2144. Ballistic trajectory data store 2180 may be accessible to weather sensor 2170 via network 2144, or ballistic trajectory data store 2180 may be integrated with weather sensor 2170. User device 2110 may comprise memory 2112 and processor(s) 2114. Memory 2112 may comprise programs 2120 and data 2130. Programs 2120 may comprise flight path generator 2124 and flight path divider 2125. Flight path generator 2124 may comprise instructions to perform operations configured to convert the ballistic trajectory into a ballistic flight path. Flight path divider 2125 may comprise instructions to perform operations configured to divide the ballistic flight path into a plurality of path segments. Programs 2120 may also comprise any combination of: condition assessor 2127, wind hold calculator 2128, and/or firing solution calculator 2129. Condition assessor 2127 may comprise instructions to perform operations configured to assess an environmental condition based on the environmental data. Data 2130 may comprise any combination of: projectile information 2131, firing information 2132, target information 2133, and/or environmental parameters 2136. User device 2110 may be configured to be operable by user 2105. User device 2110 may be configured to communicate with weather sensor 2170 via network 2142. Weather sensor 2170 may comprise weather sensor data 2172. Weather sensor 2170 may be configured to be operable by user 2105. Weather sensor 2170 may, for example, be employed by user 2105 at a FFP.

Figure 22:
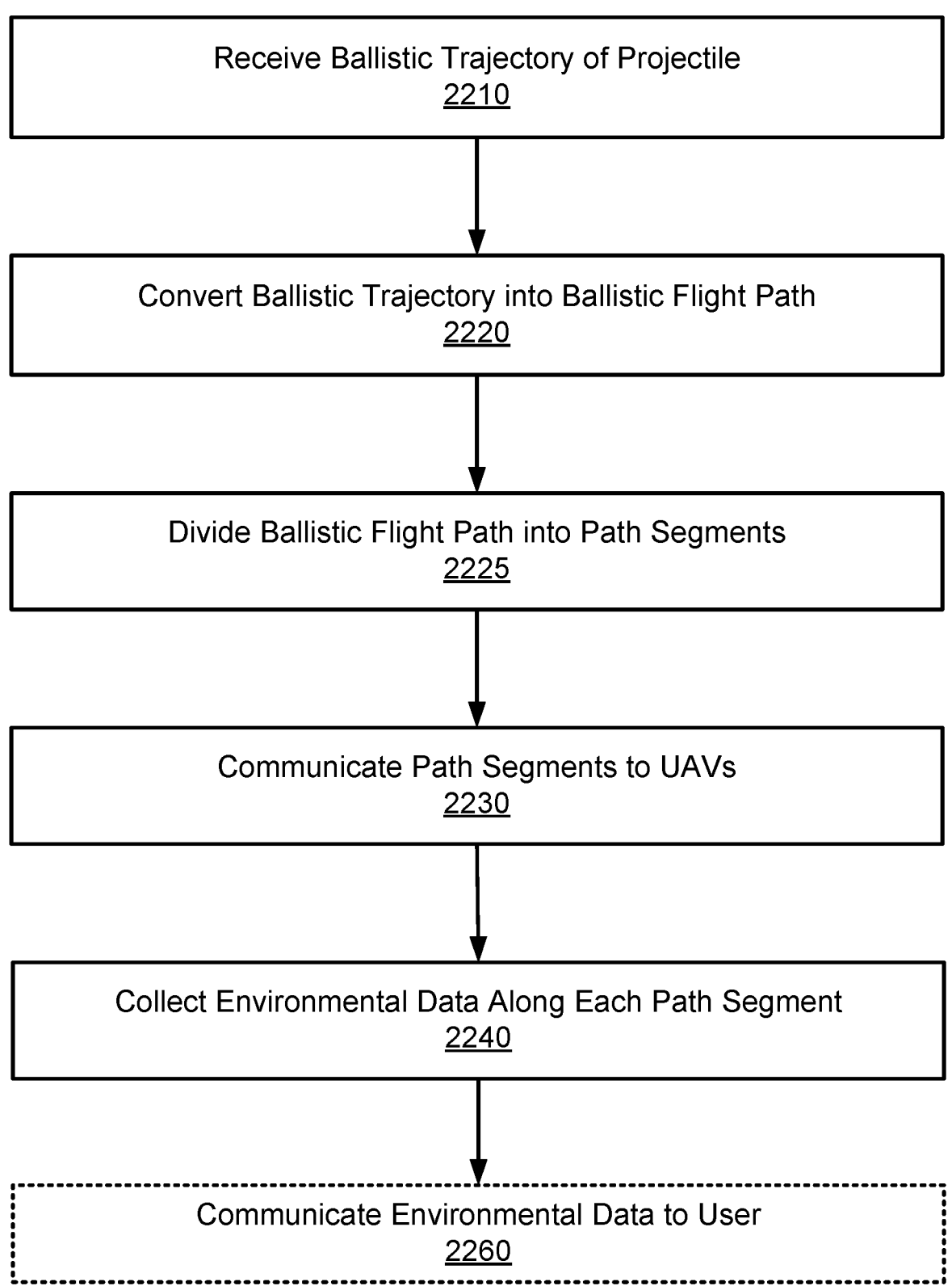
FIG. 22 is a flow diagram of a fourth example process for collecting environmental data along a ballistic flight path, consistent with disclosed embodiments.

FIG. 22 is a flow diagram of a fourth example process for collecting environmental data along a ballistic flight path, consistent with disclosed embodiments. A system for collecting environmental data along a ballistic flight path may comprise a plurality of UAVs. The system may comprise at least one memory storing instructions. The system may comprise at least one processor being configured to execute the instructions to perform operations. The operations may comprise automatically receiving the ballistic trajectory of a projectile at 2210. The operations may comprise automatically converting the ballistic trajectory into a ballistic flight path at 2220. The ballistic flight path may comprise a plurality of coordinates. The operations may comprise dividing the ballistic flight path into a plurality of path segments at 2225. The operations may comprise automatically communicating the path segments to a plurality of UAVs at 2230. Each of the UAVs may be configured to navigate along a flight path that includes one of the path segments. The operations may comprise automatically collecting environmental data along each of the path segments at 2240. The operations may comprise automatically communicating the environmental data to a user at 2260.

Figure 23:
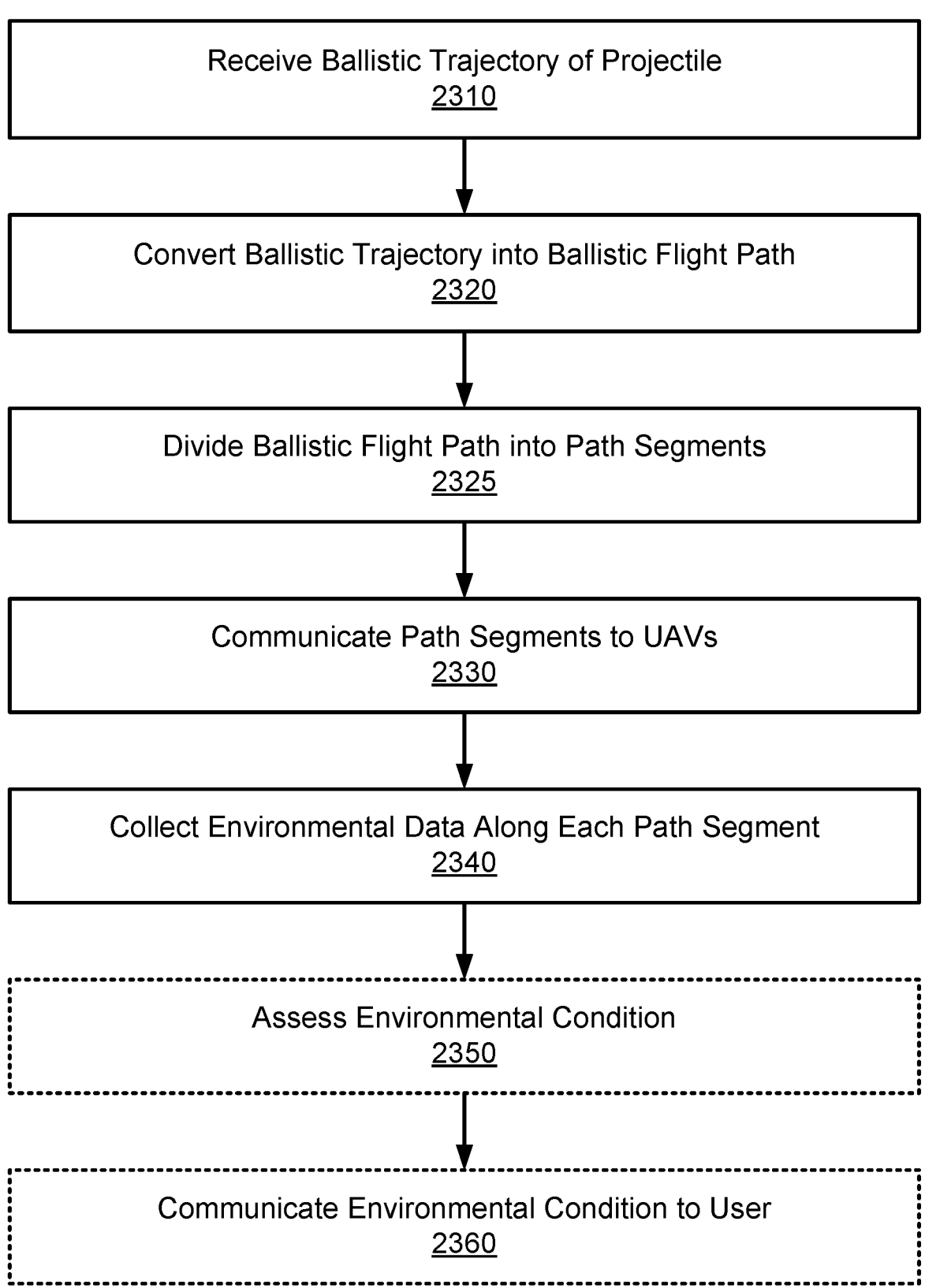
FIG. 23 is a flow diagram of a fourth example process for assessing an environmental condition along a ballistic flight path, consistent with disclosed embodiments.

FIG. 23 is a flow diagram of a fourth example process for assessing an environmental condition along a ballistic flight path, consistent with disclosed embodiments. A system for collecting environmental data along a ballistic flight path may comprise a plurality of UAVs. The system may comprise at least one memory storing instructions. The system may comprise at least one processor being configured to execute the instructions to perform operations. The operations may comprise automatically receiving the ballistic trajectory of a projectile at 2310. The operations may comprise automatically converting the ballistic trajectory into a ballistic flight path at 2320. The ballistic flight path may comprise a plurality of coordinates. The operations may comprise dividing the ballistic flight path into a plurality of path segments at 2325. The operations may comprise automatically communicating the path segments to a plurality of UAVs at 2330. Each of the UAVs may be configured to navigate along a flight path that includes one of the path segments. The operations may comprise automatically collecting environmental data along each of the path segments at 2340. The operations may comprise automatically assessing an environmental condition at 2350. The environmental condition may be based on the environmental data collected along the plurality of path segments. The operations may comprise automatically communicating the environmental condition to a user at 2360.

Figure 24:
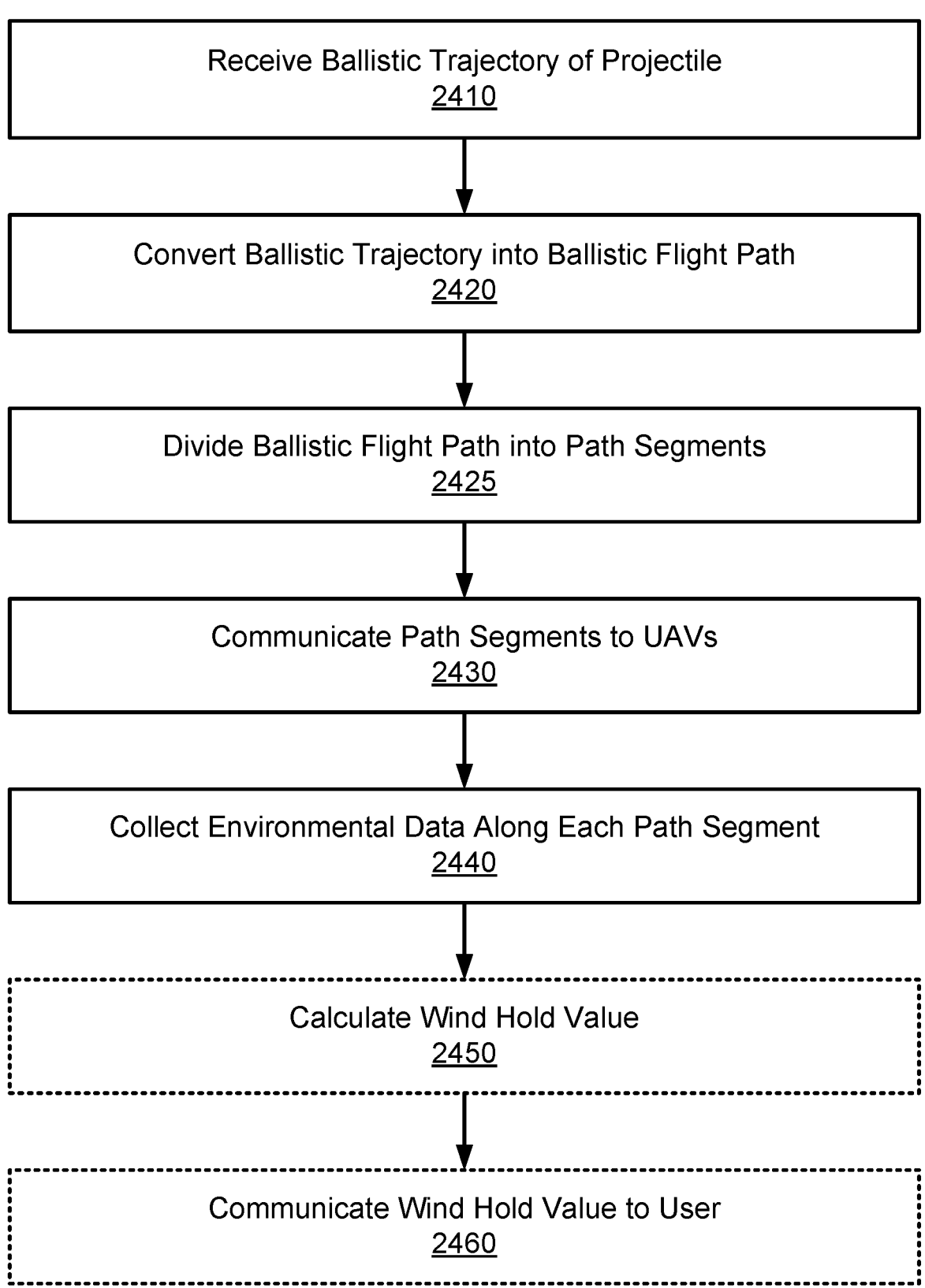
FIG. 24 is a flow diagram of a fourth example process for calculating a wind hold value based on environmental data collected along a ballistic flight path, consistent with disclosed embodiments.

FIG. 24 is a flow diagram of a fourth example process for calculating a wind hold value based on environmental data collected along a ballistic flight path, consistent with disclosed embodiments. A system for collecting environmental data along a ballistic flight path may comprise a plurality of UAVs. The system may comprise at least one memory storing instructions. The system may comprise at least one processor being configured to execute the instructions to perform operations. The operations may comprise automatically receiving the ballistic trajectory of a projectile at 2410. The operations may comprise automatically converting the ballistic trajectory into a ballistic flight path at 2420. The ballistic flight path may comprise a plurality of coordinates. The operations may comprise dividing the ballistic flight path into a plurality of path segments at 2425. The operations may comprise automatically communicating the path segments to a plurality of UAVs at 2430. Each of the UAVs may be configured to navigate along a flight path that includes one of the path segments. The operations may comprise automatically collecting environmental data along each of the path segments at 2440. The operations may comprise automatically calculating a wind hold value at 2450. The wind hold value may be based on projectile information and the environmental data collected along the plurality of path segments. The operations may comprise automatically communicating the wind hold value to a user at 2460.

Figure 25:
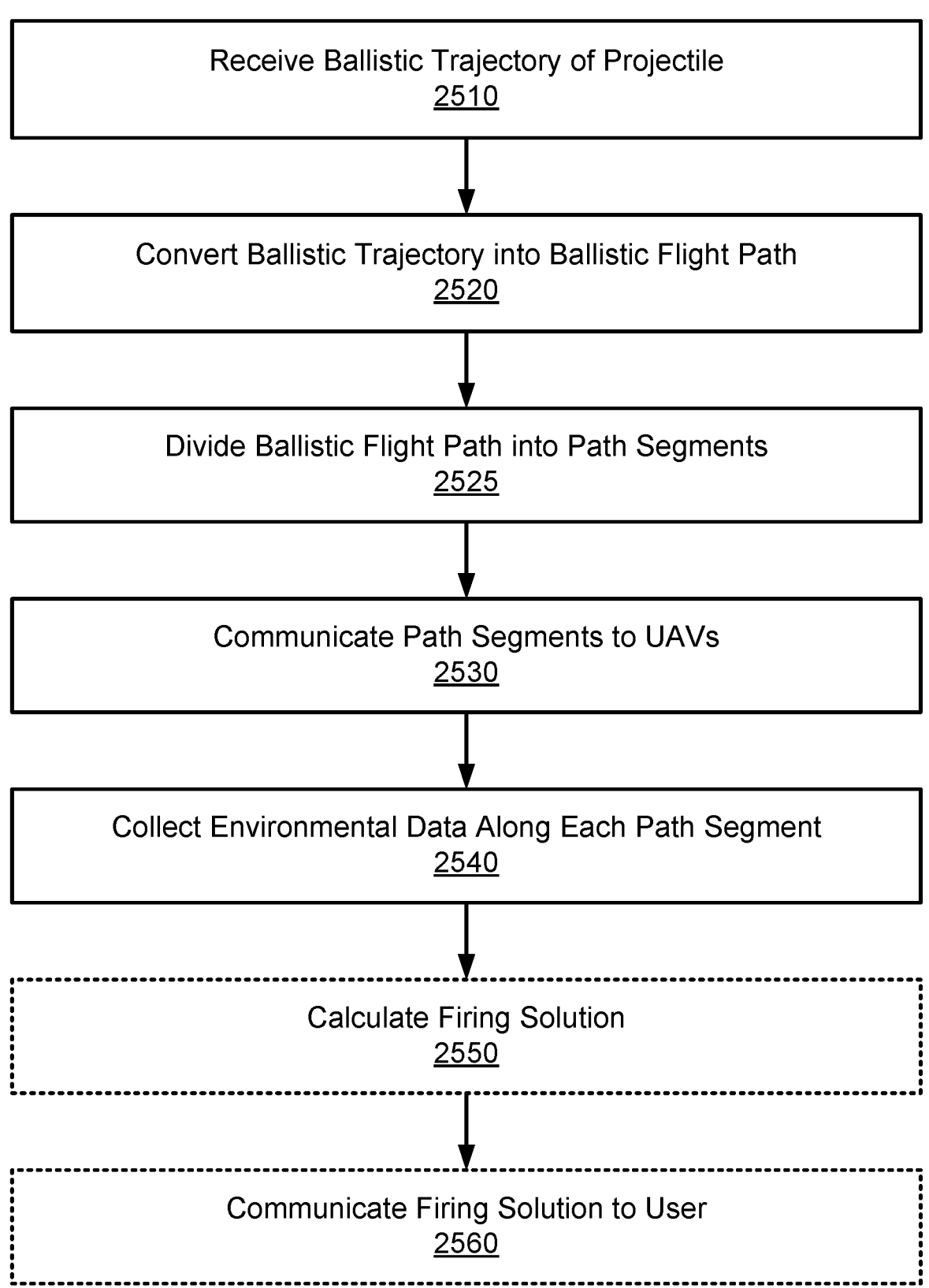
FIG. 25 is a flow diagram of a fourth example process for calculating a firing solution based on environmental data collected along a ballistic flight path, consistent with disclosed embodiments.

FIG. 25 is a flow diagram of a fourth example process for calculating a firing solution based on environmental data collected along a ballistic flight path, consistent with disclosed embodiments. A system for collecting environmental data along a ballistic flight path may comprise a plurality of UAVs. The system may comprise at least one memory storing instructions. The system may comprise at least one processor being configured to execute the instructions to perform operations. The operations may comprise automatically receiving the ballistic trajectory of a projectile at 2510. The operations may comprise automatically converting the ballistic trajectory into a ballistic flight path at 2520. The ballistic flight path may comprise a plurality of coordinates. The operations may comprise dividing the ballistic flight path into a plurality of path segments at 2525. The operations may comprise automatically communicating the path segments to a plurality of UAVs at 2530. Each of the UAVs may be configured to navigate along a flight path that includes one of the path segments. The operations may comprise automatically collecting environmental data along each of the path segments at 2540. The operations may comprise automatically calculating a firing solution at 2550. The firing solution may be based on projectile information, firing information, target information, and the environmental data collected along the plurality of path segments. The operations may comprise automatically communicating the firing solution to a user at 2560.

Figure 26:
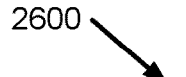
FIG. 26 illustrates an example reference table of environmental conditions consistent with disclosed embodiments.

FIG. 26 illustrates an example reference table 2600 of environmental conditions consistent with disclosed embodiments. The reference table 2600 may comprise wind speed data 2610. The wind speed data 2610 may comprise environmental data collected at a specific FFP. A reference to the specific FFP may be displayed in reference table 2600 (e.g., "FFP 1"). The reference table 2600 may comprise wind direction data 2620. The wind direction data 2620 may comprise environmental data collected at the specific FFP. The reference table 2600 may comprise composite wind reading data 2630. The composite wind reading data 2630 may comprise results from calculations performed on a specific ballistic trajectory. The calculations may be based on environmental data collected along the specific ballistic trajectory. A reference to the specific ballistic trajectory may be displayed in reference table 2600 (e.g., "Ballistic Trajectory 1"). Each line in the reference table may correlate a previous wind speed measurement 2610 and previous wind direction measurement 2620 to a previous composite wind reading 2630. The reference table may be employed at time and/or date after at least a portion of the reference table was populated with data. As an example, a shooter at FFP 1 may measure current wind speed and current wind direction. For example, the measured wind may comprise a wind speed of 5.3 mph and a wind direction from 3:00. The shooter may employ the measured wind speed and wind direction to find the closest entry under the columns for wind speed 2610 and wind direction 2620. In this example, the closest entry comprises "5 mph from 3:00". The shooter may employ the entry in reference table 2600 to select a composite wind reading 2630. In this example, the composite wind reading 2630 comprises "10 mph from 3:00". The shooter may employ the composite wind reading 2630 to determine a firing solution and/or a hold off on target. In this example, the firing solution and/or hold off based on the composite wind reading 2630 will likely be more accurate than a firing solution and/or hold off based on the current wind speed and current wind direction at the FFP.

Figure 27:
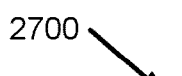
FIG. 27 illustrates an example reference table of wind hold values consistent with disclosed embodiments.

FIG. 27 illustrates an example reference table 2700 of wind hold values consistent with disclosed embodiments. The reference table 2700 may comprise wind speed data 2710. The wind speed data 2710 may comprise environmental data collected at a specific FFP. A reference to the specific FFP may be displayed in reference table 2700 (e.g., "FFP 1"). The reference table 2700 may comprise wind direction data 2720. The wind direction data 2720 may comprise environmental data collected at the specific FFP. The reference table 2700 may comprise wind hold value data 2730. The wind hold value data 2730 may comprise results from calculations performed on a specific ballistic trajectory. The calculations may be based on environmental data collected along the specific ballistic trajectory. A reference to the specific ballistic trajectory may be displayed in reference table 2700 (e.g., "Ballistic Trajectory 1"). Each line in the reference table may correlate a previous wind speed measurement 2710 and previous wind direction measurement 2720 to a wind hold value 2730. The reference table may be employed at time and/or date after at least a portion of the reference table was populated with data. As an example, a shooter at FFP 1 may measure current wind speed and current wind direction. For example, the measured wind may comprise a wind speed of 5.3 mph and a wind direction from 3:00. The shooter may employ the measured wind speed and wind direction to find the closest entry under the columns for wind speed 2710 and wind direction 2720. In this example, the closest entry comprises "5 mph from 3:00". The shooter may employ the entry in reference table 2700 to select a wind hold value 2730. In this example, the wind hold value comprises "0.9 mils". The shooter may employ the wind hold value as a hold off on target. In this example, the hold off based on the wind hold value will likely be more accurate than a hold off based on the current wind speed and current wind direction at the FFP.

Figure 28:
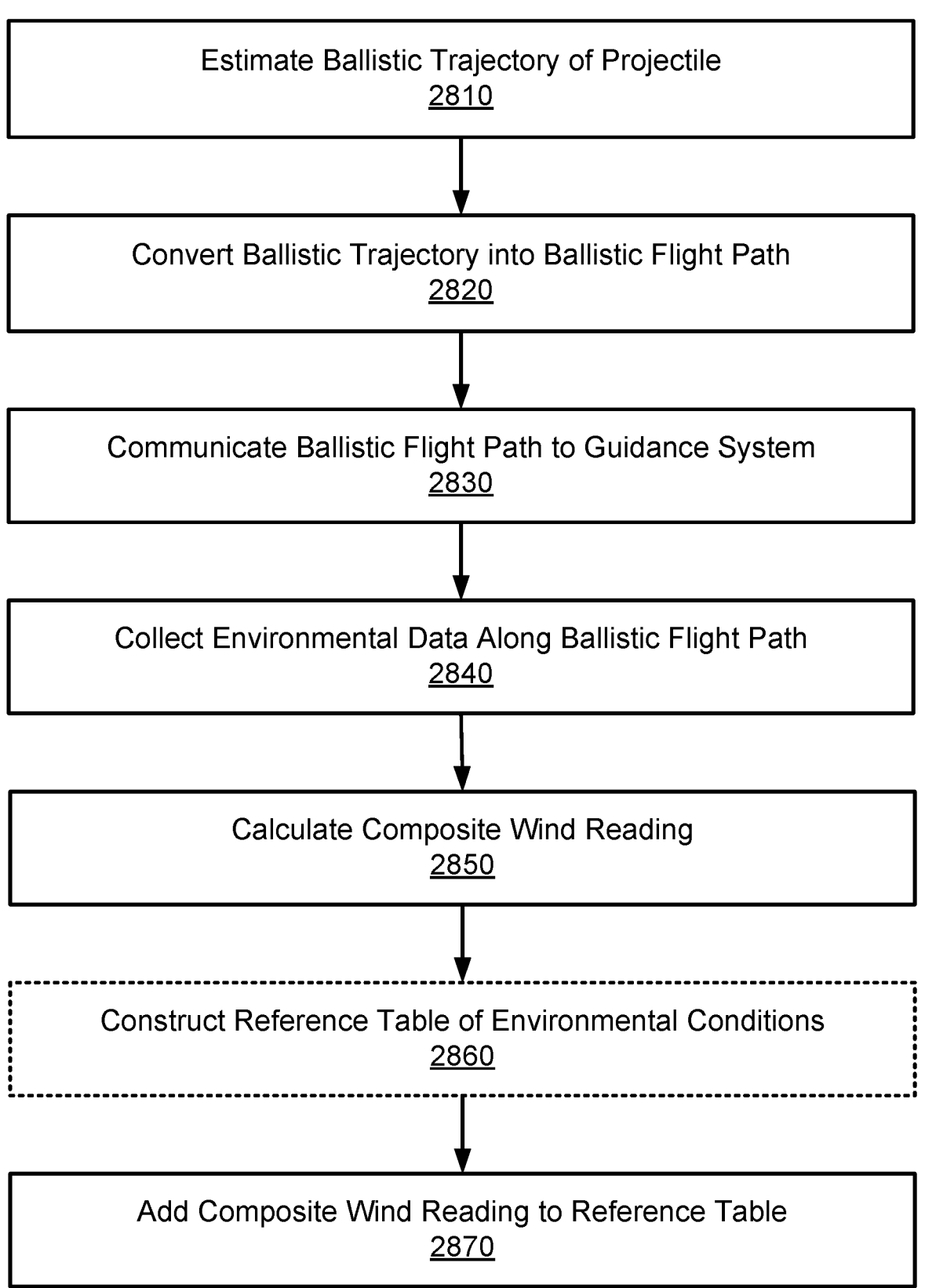
FIG. 28 is a flow diagram of an example process for constructing a reference table of environmental conditions, consistent with disclosed embodiments.

FIG. 28 is a flow diagram of an example process for constructing a reference table of environmental conditions, consistent with disclosed embodiments. An automated system for collecting environmental data along a ballistic trajectory may comprise at least one memory storing instructions. The automated system may comprise at least one processor being configured to execute the instructions to perform operations. The operations may comprise automatically estimating a ballistic trajectory of a projectile at 2810. The ballistic trajectory may be based on at least: projectile information, firing information, and/or target information. The operations may comprise automatically converting the ballistic trajectory into a ballistic flight path at 2820. The ballistic flight path may comprise a plurality of coordinates. The ballistic flight path may be based on at least: firing location information and target location information. The operations may comprise electronically communicating the ballistic flight path to a guidance system of a UAV at 2830. The guidance system may be configured to cause the UAV to navigate along the ballistic flight path. The operations may comprise automatically collecting the environmental data along the ballistic flight path at 2840. The operations may comprise automatically calculating a composite wind reading at 2850. The composite wind reading may be based on the environmental data. The operations may comprise automatically constructing a reference table of environmental conditions at 2860. The reference table of environmental conditions may be constructed when a reference table does not exist for a specific FFP and/or a specific ballistic trajectory. The operations may comprise automatically adding the composite wind reading to the reference table at 2870. The operations may repeat at least steps 2840, 2850, and 2870 as needed for distinct environmental conditions.

Figure 29:
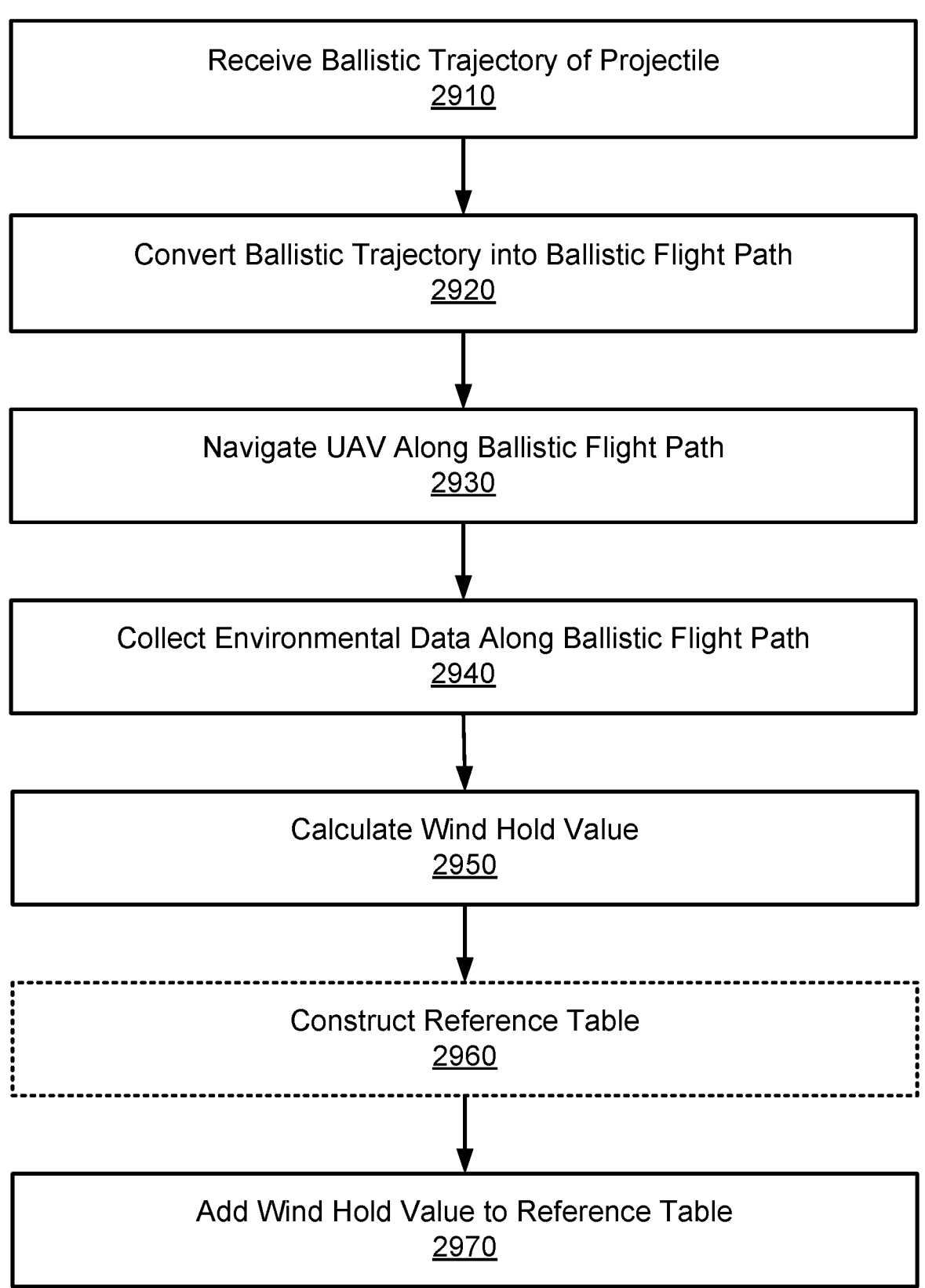
FIG. 29 is a flow diagram of a first example process for constructing a reference table of wind hold values, consistent with disclosed embodiments.

FIG. 29 is a flow diagram of a first example process for constructing a reference table of wind hold values, consistent with disclosed embodiments. A UAV for collecting environmental data along a ballistic trajectory may comprise at least one memory storing instructions. The UAV may comprise at least one processor being configured to execute the instructions to perform operations. The operations may comprise automatically receiving the ballistic trajectory of a projectile at 2910. The operations may comprise automatically converting the ballistic trajectory into a ballistic flight path at 2920. The operations may comprise automatically navigating the UAV along the ballistic flight path at 2930. The operations may comprise automatically collecting the environmental data along the ballistic flight path at 2940. The operations may comprise automatically calculating a wind hold value at 2950. The wind hold value may be based on projectile information and the environmental data. The operations may comprise automatically constructing a reference table at 2960. The reference table may be constructed when a reference table does not exist for a specific FFP and/or a specific ballistic trajectory. The operations may comprise automatically adding the wind hold value to the reference table at 2970. The operations may repeat at least steps 2930, 2940, 2950, and 2970 as needed for distinct environmental conditions.

Figure 30:
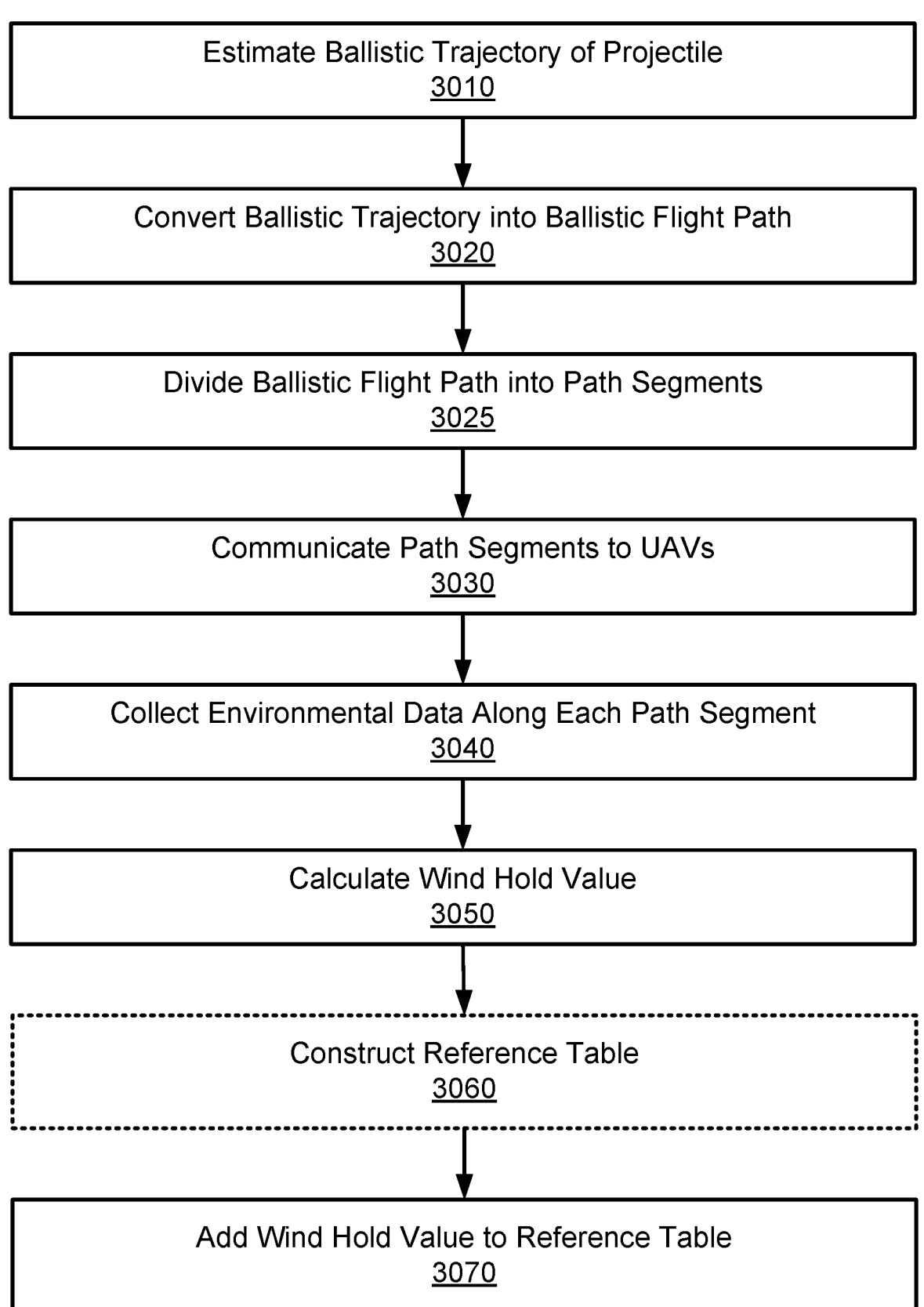
FIG. 30 is a flow diagram of a second example process for constructing a reference table of wind hold values, consistent with disclosed embodiments.

FIG. 30 is a flow diagram of a second example process for constructing a reference table of wind hold values, consistent with disclosed embodiments. A system for collecting environmental data along a ballistic flight path may comprise a plurality of UAVs. The system may comprise at least one memory storing instructions. The system may comprise at least one processor being configured to execute the instructions to perform operations. The operations may comprise automatically estimating the ballistic trajectory of a projectile at 3010. The ballistic trajectory may be based on at least: projectile information, firing information, and/or target information. The operations may comprise automatically converting the ballistic trajectory into a ballistic flight path at 3020. The ballistic flight path may comprise a plurality of coordinates. The ballistic flight path may be based on at least: firing location information and target location information. The operations may comprise dividing the ballistic flight path into a plurality of path segments at 3025. The operations may comprise automatically communicating the path segments to a plurality of UAVs at 3030. Each of the UAVs may be configured to navigate along a flight path that includes one of the path segments. The operations may comprise automatically collecting environmental data along each of the path segments at 3040. The operations may comprise automatically calculating a wind hold value at 3050. The operations may comprise automatically constructing a reference table at 3060. The reference table may be constructed when a reference table does not exist for a specific FFP and/or a specific ballistic trajectory. The operations may comprise automatically adding the wind hold value to the reference table at 3070. The operations may repeat at least steps 3030, 3040, 3050, and 3070 as needed for distinct environmental conditions.

Figure 31:
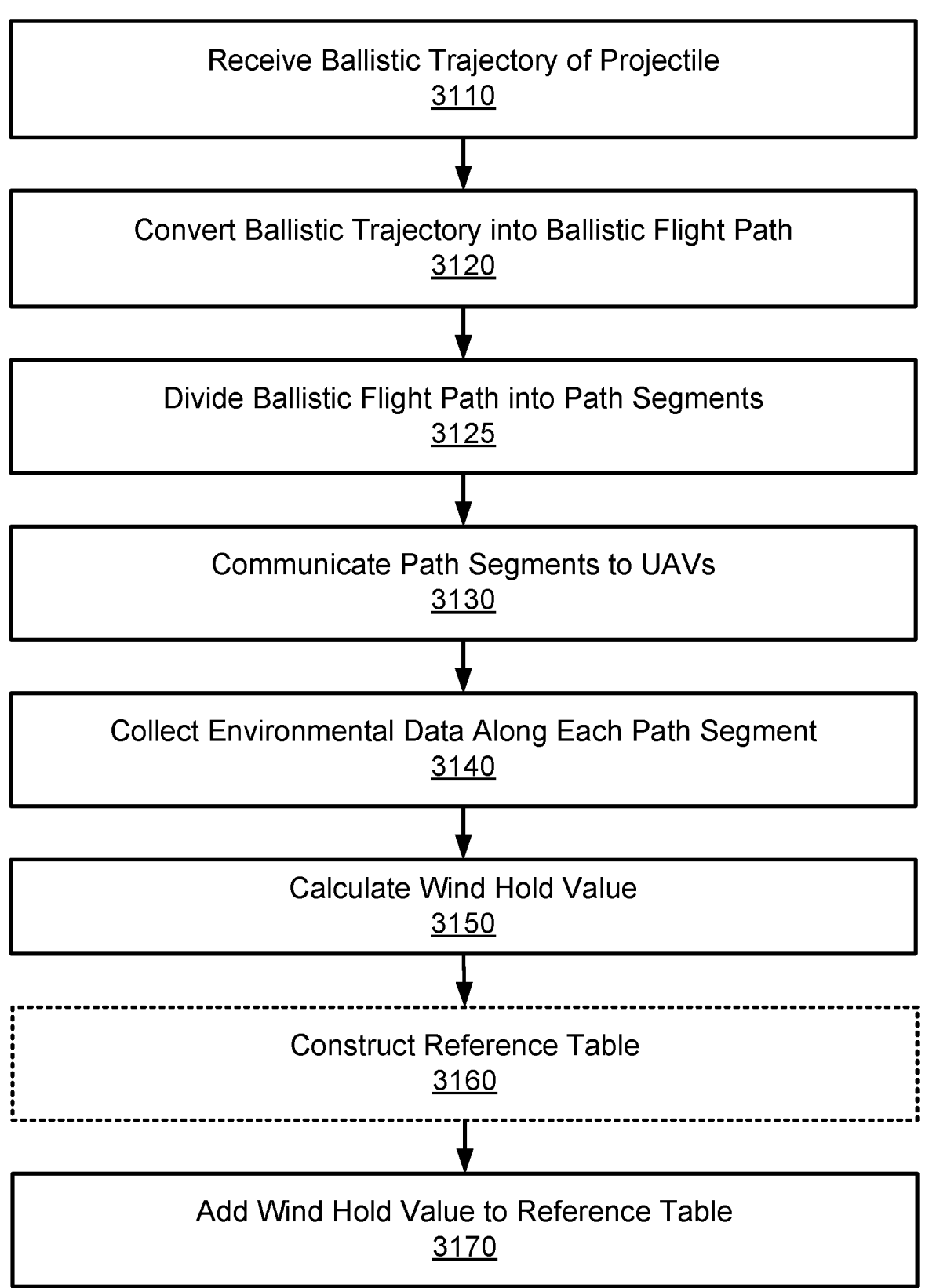
FIG. 31 is a flow diagram of a third example process for constructing a reference table of wind hold values, consistent with disclosed embodiments.

FIG. 31 is a flow diagram of a third example process for constructing a reference table of wind hold values, consistent with disclosed embodiments. A system for collecting environmental data along a ballistic flight path may comprise a plurality of UAVs. The system may comprise at least one memory storing instructions. The system may comprise at least one processor being configured to execute the instructions to perform operations. The operations may comprise automatically receiving the ballistic trajectory of a projectile at 3110. The operations may comprise automatically converting the ballistic trajectory into a ballistic flight path at 3120. The ballistic flight path may comprise a plurality of coordinates. The operations may comprise dividing the ballistic flight path into a plurality of path segments at 3125. The operations may comprise automatically communicating the path segments to a plurality of UAVs at 3130. Each of the UAVs may be configured to navigate along a flight path that includes one of the path segments. The operations may comprise automatically collecting environmental data along each of the path segments at 3140. The operations may comprise automatically calculating a wind hold value at 3150. The operations may comprise automatically constructing a reference table at 3160. The reference table may be constructed when a reference table does not exist for a specific FFP and/or a specific ballistic trajectory. The operations may comprise automatically adding the wind hold value to the reference table at 3170. The operations may repeat at least steps 3130, 3140, 3150, and 3170 as needed for distinct environmental conditions.

Figure 32:
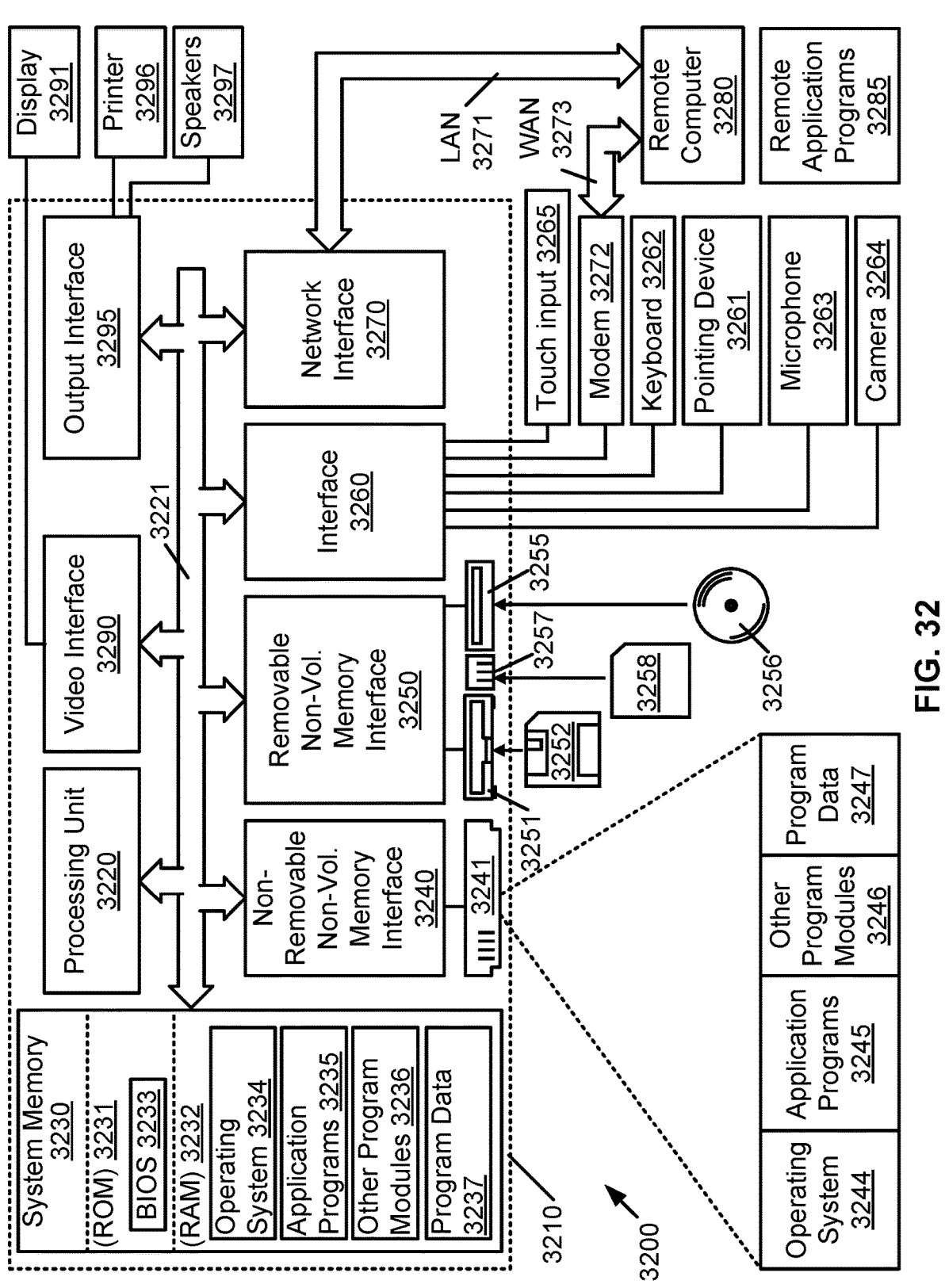
FIG. 32 is a block diagram of an example computing environment in which aspects of disclosed embodiments may be practiced.

FIG. 32 is a block diagram of an example computing environment 3200 in which aspects of disclosed embodiments may be practiced. The computing environment may comprise computing device 3210. Components of computing device 3210 may include, but are not limited to, a processing unit 3220, a system memory 3230, and a system bus 3221 that couples various system components including the system memory 3230 to the processing unit 3220.

Computing device 3210 may comprise a variety of computer readable media. Computer readable media may be available media accessible by computing device 3210 and may include both volatile and nonvolatile media, removable and non-removable media. By way of example, and not limitation, computer readable media may comprise computer storage media and communication media. Computer storage media may comprise both volatile and nonvolatile, removable and non-removable media implemented in a method or technology for storage of data such as computer readable instructions, data structures, program modules, other data, combinations thereof, and/or the like. Computer storage media may comprise, but is not limited to, random access memory (RAM), read-only memory (ROM), electrically erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, and/or any other medium which may be employed to store data and which may be accessed by computer 3210. Communication media may comprise computer readable instructions, data structures, program modules and/or other data in a modulated data signal such as a carrier wave and/or other transport mechanism and may comprise data delivery media. The term "modulated data signal" means a signal that has one or more of its characteristics set or changed in such a manner as to encode data in the signal. By way of example, and not limitation, communication media includes wired media such as a wired network or direct-wired connection, and wireless media such as acoustic, radio frequency (RF), infrared and other wireless media. Combinations of any of the above may also be included within the scope of computer readable media.

The system memory 3230 may comprise computer storage media in the form of volatile and/or nonvolatile memory such as ROM 3231 and RAM 3232. A basic input/output system 3233 (BIOS), containing the basic routines that help to transfer data between elements within computer 3210, such as during start-up, may be stored in ROM 3231. RAM 3232 may comprise data and/or program modules that may be accessible to and/or presently being operated on by processing unit 3220. By way of example, and not limitation, FIG. 32 illustrates operating system 3234, application programs 3235, other program modules 3236, and program data 3237.

The computing device 3210 may also comprise other removable/non-removable volatile/nonvolatile computer storage media. By way of example only, FIG. 32 illustrates a hard disk drive 3241 that may read from or write to non-removable, nonvolatile magnetic media, a magnetic disk drive 3251 that may read from or write to a removable, nonvolatile magnetic disk 3252, a flash drive reader 3257 that may read flash drive 3258, and an optical disk drive 3255 that may read from or write to a removable, nonvolatile optical disk 3256 such as a CD ROM or other optical media. Other removable/non-removable, volatile/nonvolatile computer storage media that may be used in the operating environment include, but are not limited to, magnetic tape cassettes, flash memory cards, digital versatile disks, digital video tape, solid state RAM, solid state ROM, and the like. The hard disk drive 3241 may be connected to the system bus 3221 through a non-removable memory interface such as interface 3240, and magnetic disk drive 3251 and optical disk drive 3255 may be connected to the system bus 3221 by a removable memory interface, such as interface 3250.

The drives and their associated computer storage media discussed above and illustrated in FIG. 32 provide storage of computer readable instructions, data structures, program modules and other data for the computer 3210. In FIG. 32, for example, hard disk drive 3241 is illustrated as storing operating system 3244, application programs 3245, program data 3247, and other program modules 3246. Additionally, for example, non-volatile memory may include instructions for presenting images on a display 3291 of computing device 3200 and/or the like. Similarly, non-volatile memory may comprise instructions for causing the presentation of images on the display of a remote computing device 3280 and/or the like. Display 3291 and touch input 3265 may be integrated into the same device.

A user may enter commands and data into computing device 3210 through input devices such as a touch input device 3265, a keyboard 3262, a microphone 3263, a camera 3264, and a pointing device 3261, such as a mouse, trackball or touch pad. These and other input devices may be connected to the processing unit 3220 through interface 3260 coupled to system bus 3221, but may be connected by other interface and bus structures, such as a parallel port, game port or a universal serial bus (USB). A display 3291 or other type of display device may be connected to the system bus 3221 via an interface, such as a video interface 3290. Other devices, such as, for example, speakers 3297 and printer 3296 may be connected to the system via output interface 3295.

The computing device 3210 may be operated in a networked environment using logical connections to one or more remote computers, such as a remote computer 3280. Remote computer 3280 may be a personal computer, a hand-held device, a server, a router, a network PC, a peer device or other common network node, and typically includes many or all of the elements described above relative to the computing device 3210. The logical connections depicted in FIG. 32 include a local area network (LAN) 3271 and a wide area network (WAN) 3273, but may also include other networks. Such networking environments are commonplace in offices, enterprise-wide computer networks, intranets and the Internet.

When used in a LAN networking environment, the computing device 3210 is connected to the LAN 3271 through a network interface or adapter 3270. When used in a WAN networking environment, the computing device 3210 may comprise a modem 3272 or other means for establishing communications over the WAN 3273, such as the Internet. The modem 3272, which may be internal or external, may be connected to the system bus 3221 via interface 3260, or other appropriate mechanism. The modem 3272 may be wired or wireless. Examples of wireless devices may comprise, but are not limited to: Wi-Fi and Bluetooth. In a networked environment, program modules depicted relative to the computing device 3210, or portions thereof, may be stored in the remote memory storage device. By way of example, and not limitation, FIG. 32 illustrates remote application programs 3285 as residing on remote computer 3280. It will be appreciated that the network connections shown are presented as examples only and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

In this specification, "a" and "an" and similar phrases are to be interpreted as "at least one" and "one or more."

References to "a", "an", and "one" are not to be interpreted as "only one". In this specification, the term "may" is to be interpreted as "may, for example." In other words, the term "may" is indicative that the phrase following the term "may" is an example of one of a multitude of suitable possibilities that may, or may not, be employed to one or more of the various embodiments. In this specification, the phrase "based on" is indicative that the phrase following the term "based on" is an example of one of a multitude of suitable possibilities that may, or may not, be employed to one or more of the various embodiments. References to "an" embodiment in this disclosure are not necessarily to the same embodiment.

Many of the elements described in the disclosed embodiments may be implemented as modules. A module is defined here as an isolatable element that performs a defined function and has a defined interface to other elements. The elements described in this disclosure may be implemented in hardware, a combination of hardware and software, firmware, wetware (i.e., hardware with a biological element) or a combination thereof, all of which are behaviorally equivalent. For example, modules may be implemented using computer hardware in combination with software routine(s) written in a computer language (Java, HTML, XML, PHP, Python, ActionScript, JavaScript, Ruby, Prolog, SQL, VBScript, Visual Basic, Perl, C, C++, Objective-C or any other computer language). Additionally, it may be possible to implement modules using physical hardware that incorporates discrete or programmable analog, digital and/or quantum hardware. Examples of programmable hardware include: computers, microcontrollers, microprocessors, application-specific integrated circuits (ASICs), field programmable gate arrays (FPGAs), and complex programmable logic devices (CPLDs). Computers, microcontrollers and microprocessors are programmed using languages such as assembly, C, C++ or any other language. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies may be used in combination to achieve the result of a functional module.

Some embodiments may employ processing hardware. Processing hardware may include one or more processors, computer equipment, embedded system, machines and/or any other processing hardware. The processing hardware may be configured to execute instructions. The instructions may be stored on a machine-readable medium. According to some embodiments, the machine-readable medium (e.g., automated data medium) may be a medium configured to store data in a machine-readable format that may be accessed by an automated sensing device. Examples of machine-readable media include: magnetic disks, cards, and drums, flash memory, memory cards, electrically erasable programmable read-only memory (EEPROM), solid state drives, optical disks, barcodes, magnetic ink characters, and/or any other machine-readable media.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described example embodiments. In particular, it should be noted that, for example purposes, some systems for collecting environmental data have been described as including a database and/or a user device. A person having ordinary skill in the art will recognize that the database may be collective based and comprise: portable equipment, broadcast equipment, virtual components, application(s) distributed over a broad combination of computing sources, part of a cloud, and/or any other collective based solution. Similarly, the user device may be a user based client, portable equipment, broadcast equipment, a virtual device, application(s) distributed over a broad combination of computing sources, part of a cloud, and/or any other user based solution. Additionally, it should be noted that, for example purposes, several of the various embodiments were described as programs. However, a person having ordinary skill in the art will recognize that many various languages and frameworks may be employed to build and use embodiments of the present disclosure.

In this specification, various embodiments are disclosed. Limitations, features, and/or elements from the disclosed example embodiments may be combined to create further embodiments within the scope of the disclosure. Moreover, the scope includes any and all embodiments having equivalent elements, modifications, omissions, adaptations, or alterations based on the present disclosure. Further, aspects of the disclosed methods can be modified in any manner, including by reordering aspects, or inserting or deleting aspects.

In addition, it should be understood that any figures that highlight any functionality and/or advantages, are presented for example purposes only. The disclosed architecture is sufficiently flexible and configurable, such that it may be utilized in ways other than that shown. For example, the blocks presented in any flowchart may be re-ordered or only optionally used in some embodiments.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method for collecting environmental data along a ballistic trajectory, the method comprising:
   (a) automatically converting a ballistic trajectory of a projectile into a ballistic flight path comprising one or more segments, each of the segments comprising a plurality of coordinates, the coordinates located along the ballistic trajectory;
   (b) automatically navigating an Unmanned Aerial Vehicle (UAV) along the ballistic flight path; and
   (c) automatically collecting environmental data along the ballistic flight path through employment of the UAV.

2. The method according to claim 1, wherein the projectile is configured to be spin stabilized in flight.

3. The method according to claim 1, wherein the ballistic trajectory is further based on environmental parameters.

4. The method according to claim 3, wherein the environmental parameters are based on UAV sensor data received from a UAV sensor.

5. The method according to claim 3, wherein the environmental parameters are based on sensor data electronically received from a weather sensor.

6. The method according to claim 1, wherein automatically collecting environmental data along the ballistic flight path comprises receiving data from an ultrasonic anemometer.

7. The method according to claim 1, wherein the environmental data comprises wind speed data and wind direction data.

8. The method according to claim 1, wherein the environmental data comprises air temperature data.

9. The method according to claim 1, wherein the environmental data comprises barometric pressure data.

10. The method according to claim 1, wherein the environmental data comprises humidity data.

11. The method according to claim 1, wherein the environmental data comprises air density data.

12. The method according to claim 1, wherein the environmental data is based on thrust information.

13. The method according to claim 1, further comprising automatically communicating the environmental data to a user.

14. The method according to claim 1, further comprising:
   (a) automatically assessing an environmental condition based on the environmental data; and
   (b) automatically communicating the environmental condition to a user.

15. The method according to claim 14, wherein the environmental condition comprises a composite wind reading.

16. The method according to claim 1, further comprising:
   (a) automatically calculating a wind hold value based on the environmental data; and
   (b) automatically communicating the wind hold value to a user.

17. The method according to claim 1, further comprising:
   (a) automatically calculating a firing solution based on the environmental data; and
   (b) automatically communicating the firing solution to a user.

18. The method according to claim 1, further comprising:
   (a) automatically constructing a reference table of environmental conditions, the reference table comprising at least a wind direction and a plurality of wind speeds for a specific ballistic trajectory; and
   (b) automatically communicating the reference table to a user.

19. The method according to claim 18, wherein the reference table further comprises a plurality of composite wind readings.

20. The method according to claim 18, wherein the reference table further comprises a plurality of wind holds.

\* \* \* \* \*